US012579850B2

(12) United States Patent
Terasawa et al.

(10) Patent No.: US 12,579,850 B2
(45) Date of Patent: Mar. 17, 2026

(54) METHOD OF MANAGING POWER STORAGE AND VEHICLE

(71) Applicant: TOYOTA JIDOSHA KABUSHIKI KAISHA, Toyota (JP)

(72) Inventors: Yuko Terasawa, Tokyo-to (JP);
Makoto Kakuchi, Toyota (JP);
Toshiaki Karasawa, Tokyo-to (JP);
Takeshi Higashi, Nagoya (JP);
Yoshihiko Endo, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 18/532,437

(22) Filed: Dec. 7, 2023

(65) Prior Publication Data

US 2024/0233460 A1 Jul. 11, 2024

(30) Foreign Application Priority Data

Jan. 11, 2023 (JP) ................................. 2023-002523

(51) Int. Cl.
*G07C 5/08* (2006.01)
*G06Q 40/08* (2012.01)
*G07C 5/00* (2006.01)

(52) U.S. Cl.
CPC .............. *G07C 5/08* (2013.01); *G06Q 40/08* (2013.01); *G07C 5/008* (2013.01)

(58) Field of Classification Search
CPC .......... G07C 5/08; G07C 5/008; G06Q 40/08; B60L 58/10; B60L 3/00
See application file for complete search history.

(56) References Cited

U.S. PATENT DOCUMENTS

| | | | | |
|---|---|---|---|---|
| 9,218,626 | B1 * | 12/2015 | Haller, Jr. .......... | G06Q 10/0875 |
| 2002/0161533 | A1 * | 10/2002 | Uegaki .................. | G06Q 40/08 |
| | | | | 702/35 |
| 2020/0311805 | A1 * | 10/2020 | Sailer ................. | G06Q 30/0645 |
| 2020/0376979 | A1 * | 12/2020 | Liang ...................... | B60L 53/80 |
| 2021/0116256 | A1 * | 4/2021 | Konrardy ............. | G06Q 50/265 |
| 2021/0239478 | A1 * | 8/2021 | Mathai .................... | G06F 16/27 |
| 2021/0367221 | A1 * | 11/2021 | Ing ........................ | H02J 7/0013 |
| 2022/0050925 | A1 | 2/2022 | Gyllenram | |
| 2022/0111812 | A1 | 4/2022 | Murakami | |
| 2022/0121859 | A1 * | 4/2022 | Nagao .................. | G07C 5/008 |

FOREIGN PATENT DOCUMENTS

| | | |
|---|---|---|
| JP | 2006-350520 A | 12/2006 |
| JP | 2011-096233 A | 5/2011 |
| JP | 2022-064527 A | 4/2022 |

\* cited by examiner

*Primary Examiner* — Anne Marie Antonucci
*Assistant Examiner* — Connor L Knight
(74) *Attorney, Agent, or Firm* — Sughrue Mion, PLLC

(57) ABSTRACT

There is a method of managing a power storage, and the method includes determining whether or not a vehicle, including a body and a power storage mounted on the body, has been involved in an accident. The method also includes determining whether or not an owner of the power storage is the same as an owner of the body when it is determined that the vehicle has been involved in the accident. The method also includes notifying a terminal of the owner of the power storage of occurrence of the accident of the vehicle including the power storage when the owner of the power storage is determined as not being identical to the owner of the body.

12 Claims, 10 Drawing Sheets

METHOD OF MANAGING POWER STORAGE AND VEHICLE

CROSS REFERENCE TO RELATED APPLICATIONS

This nonprovisional application is based on Japanese Patent Application No. 2023-002523 filed with the Japan Patent Office on Jan. 11, 2023, the entire contents of which are hereby incorporated by reference.

BACKGROUND

Field

The present disclosure relates to a method of managing a power storage and a vehicle.

Description of the Background Art

Japanese Patent Laying-Open No. 2022-064527 discloses a technique to cause an electronic control unit driven by an auxiliary battery as a drive power supply to perform low-voltage-control exclusively on a battery cell in a battery module that is selected in advance in a case where magnitude of an impact detected by an impact detection sensor configured to detect magnitude of an impact applied to a vehicle is equal to or greater than a predetermined value.

SUMMARY OF THE DISCLOSURE

Vehicles have recently been electrified worldwide, and technologies in four fields called "CASE" (connected, autonomous, shared, and electric) have particularly attracted attention. A vehicle lease service (including a vehicle sharing service) for lease of vehicles to users also represents one of such technologies. Japanese Patent Laying-Open No. 2022-064527, however, does not sufficiently take into consideration, occurrence of an accident of a leased vehicle or occurrence of an accident of a vehicle on which a leased power storage is mounted. Specifically, according to the technique described in Japanese Patent Laying-Open No. 2022-064527, a user of the vehicle can know occurrence of an accident, whereas it is difficult for an owner of the power storage to know occurrence of an accident in the case where the power storage is leased.

The present disclosure was made to solve the problem above, and an object thereof is to properly notify an owner of a power storage included in a vehicle, of occurrence of an accident, on the occurrence of a vehicle accident.

According to a form according to a first point of view of the present disclosure, a method of managing a power storage shown below is provided.

(Clause 1) The method of managing a power storage includes determining whether a vehicle has been involved in an accident, the vehicle including a body and a power storage mounted on the body, determining whether an owner of the power storage is identical to an owner of the body when it is determined that the vehicle has been involved in the accident, and notifying a terminal of the owner of the power storage, of occurrence of the accident of the vehicle including the power storage when the owner of the power storage is determined as not being identical to the owner of the body.

In the management method, when a vehicle is involved in an accident, whether or not the owner of the power storage included in the vehicle is the same as the owner of the body is determined. When the owner of the power storage is determined as someone other than the owner of the body, a terminal of the owner of the power storage is notified of occurrence of the accident of the vehicle including the power storage. On the occurrence of the vehicle accident, a user of the vehicle can recognize occurrence of the accident. According to the method, when the owner of the power storage included in the vehicle is not the same as the owner of the body, the owner of the power storage can be notified of occurrence of the accident.

The terminal of the owner of the power storage may be a stationary computer (for example, a server) or a terminal (for example, a smartphone) carried by the owner of the power storage.

The method according to Clause 1 may be configured according to Clause 2 or 3 shown below.

(Clause 2) The method according to Clause 1 further includes a feature below. The method of managing a power storage further includes notifying a terminal of an insurance company that provides an insurance that covers the vehicle, of occurrence of the accident of the vehicle when the owner of the power storage is determined as not being identical to the owner of the body.

According to the method, the insurance company that provides the insurance that covers the vehicle can be notified of occurrence of the accident.

(Clause 3) The method according to Clause 1 or 2 further includes a feature below. The method of managing a power storage further includes giving a user of the vehicle, information for eligibility for coverage by an insurance service in connection with a damage to the vehicle caused by the accident when the owner of the power storage is determined as being identical to the owner of the body.

According to the method, when the vehicle covered by the insurance service is involved in the accident, the user of the vehicle is given information for eligibility for coverage by the insurance service. The user of the vehicle is thus more readily eligible for coverage by the insurance service.

The method according to any one of Clauses 1 to 3 may be configured according to Clause 4 or 5 shown below.

(Clause 4) The method according to any one of Clauses 1 to 3 further includes determining whether the owner of the power storage is identical to the owner of the body based on owner information of the body and owner information of the power storage stored in the vehicle.

(Clause 5) The method according to any one of Clauses 1 to 3 further includes determining whether the owner of the power storage is identical to the owner of the body based on lease information of the power storage stored in the vehicle.

The method according to Clause 1 may be configured according to any one of Clauses 6 to 10 shown below.

(Clause 6) The method according to any one of Clauses 1 to 5 further includes giving the notification to the terminal of the owner of the power storage by using contact information of the owner of the power storage stored in the vehicle.

According to the configuration, notification to the terminal of the owner of the power storage described previously can suitably be given with the use of the contact information of the owner of the power storage stored in the vehicle.

(Clause 7) In the method according to any one of Clauses 1 to 6, the terminal of the owner of the power storage is a server that provides a service for lease of the power storage to the owner of the body.

According to the configuration, when a vehicle including a power storage leased by the lease service is involved in an accident, the server that provides the lease service can be given the notification described previously.

(Clause 8) The method according to any one of Clauses 1 to 7 further includes calculating a degree of damage to the power storage when the vehicle is determined as having been involved in the accident, determining whether to replace the power storage mounted on the vehicle based on the calculated degree of damage, and notifying the terminal of the owner of the power storage, of occurrence of the accident of the vehicle and replacement of the power storage when it is determined that the owner of the power storage is not identical to the owner of the body and that the power storage is to be replaced.

According to the configuration, the terminal of the owner of the power storage is notified of whether or not to replace the power storage. The owner of the power storage can thus recognize whether or not the power storage is detached from the vehicle.

(Clause 9) The method according to Clause 8 further includes requesting a replacement station that replaces a power storage for a vehicle to secure a power storage that replaces the power storage mounted on the body when the terminal of the owner of the power storage receives notification of replacement of the power storage.

According to the method, when replacement of the power storage mounted on the vehicle is necessary, the replacement station more readily prepares a power storage for replacement early.

Instead of the configuration in Clause 9, a configuration in Clause 10 shown below may be adopted.

(Clause 10) The method according to Clause 8 further includes determining, by the terminal of the owner of the power storage that has received notification of replacement of the power storage, whether the power storage included in the vehicle is covered by an insurance service and requesting, by the terminal of the owner of the power storage, a replacement station that replaces a power storage for a vehicle to secure a power storage that replaces the power storage included in the vehicle when it is determined that the power storage included in the vehicle is covered by the insurance service.

According to a form according to a second point of view of the present disclosure, a vehicle shown below is provided.

(Clause 11) The vehicle performs the method of managing a power storage according to any one of Clauses 1 to 3. The vehicle includes a body, a power storage mounted on the body, a storage where owner information indicating an owner of the body and an owner of the power storage is stored, an impactive force sensor that detects impactive force applied to the body, and a processor that performs the method for the power storage. The processor is configured to determine whether the vehicle has been involved in an accident based on a result of detection by the impactive force sensor. The processor is configured to determine whether the owner of the power storage is identical to the owner of the body based on the owner information read from the storage when the processor determines that the vehicle has been involved in the accident.

According to the vehicle, the method of managing a power storage described previously is suitably performed.

The vehicle including the power storage may be an electrically powered vehicle (xEV) that uses electric power as the entirety or a part of a motive power source. Examples of the xEV include a battery electric vehicle (BEV), a hybrid electric vehicle (HEV), a plug-in hybrid electric vehicle (PHEV), and a fuel cell electric vehicle (FCEV).

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
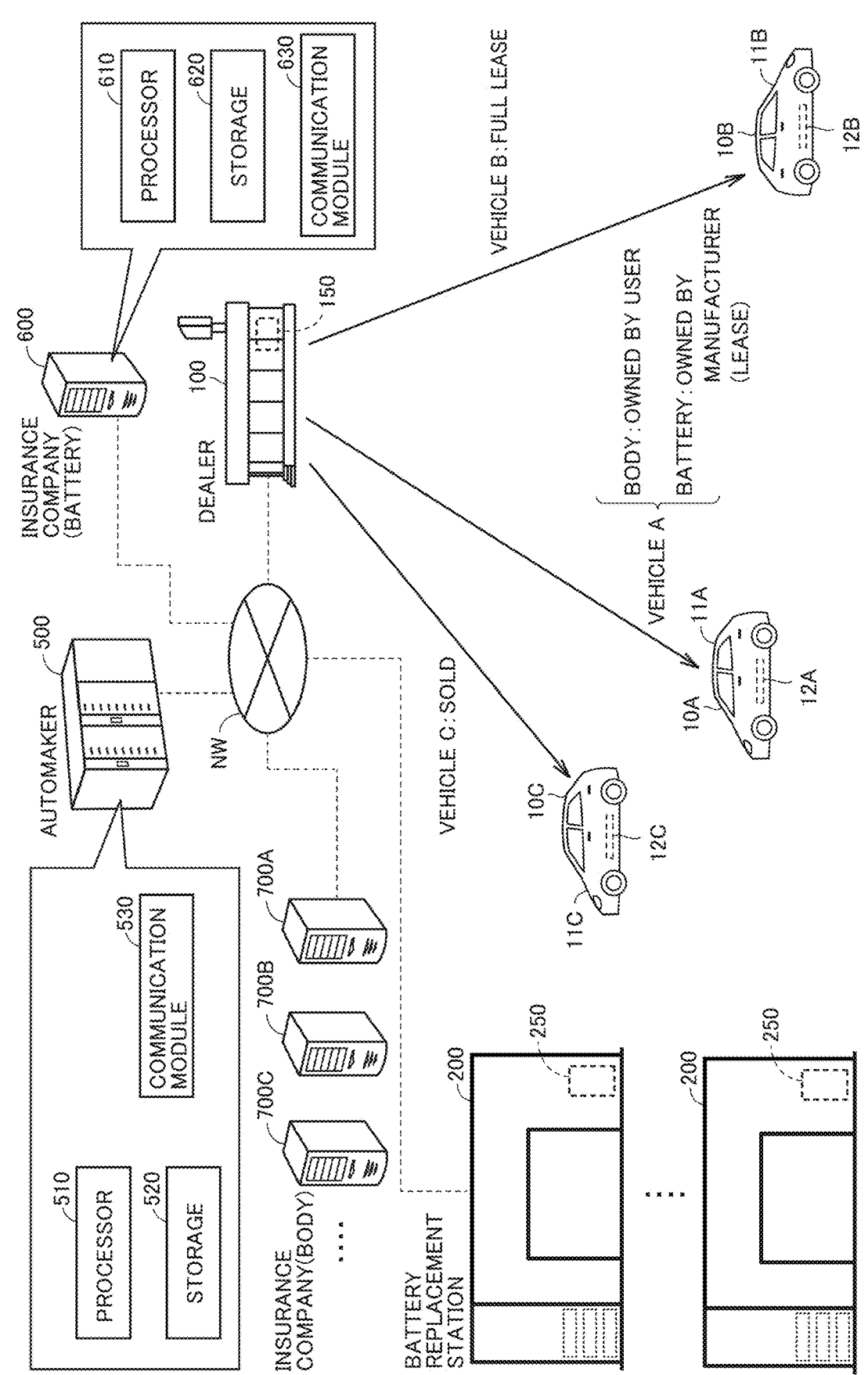
FIG. 1 is a diagram for illustrating overview of a power storage management system according to an embodiment of the present disclosure.

An embodiment of the present disclosure will be described in detail with reference to the drawings. The same or corresponding elements in the drawings have the same reference characters allotted and description thereof will not be repeated.

FIG. 1 is a diagram for illustrating overview of a power storage management system according to this embodiment. The management system shown in FIG. 1 includes a dealer 100, a battery replacement station (which is denoted as "BSta" below) 200, a management center 500, an insurance server 600, and insurance servers 700A, 700B, 700C, . . . .

Management center 500 is a server that provides a lease service for lease of a power storage for a vehicle (for example, for an xEV). Management center 500 manages information on the lease service. Management center 500 belongs, for example, to an automaker. In this embodiment, the automaker also serves as a leasing company. Insurance server 600 is a server that provides an insurance service (which is also referred to as a "battery insurance" below) relating to a damage to the power storage for the vehicle (for example, for the xEV). The battery insurance is a service for compensation for a damage to the power storage mounted on the vehicle. Insurance server 600 manages information on the insurance service. Insurance server 600 belongs, for example, to an insurance company. The automaker may also serve as the insurance company. Insurance server 600 may belong to the automaker. Insurance server 600 provides, in coordination with management center 500, the insurance service relating to the damage to the power storage leased by the lease service.

Each of insurance servers 700A, 700B, 700C, . . . is a server that provides an insurance service (which is also referred to as a "body insurance" below) relating to a damage to a body portion or an insurance service (which is also referred to as a "car insurance" below) relating to a damage to the whole vehicle (including the body and the power storage). Each of the body insurance and the car insurance is a service for compensation for a damage to a vehicle in a target range (the body portion or the whole vehicle). Each of insurance servers 700A, 700B, 700C, . . . belongs, for example, to an insurance company which is not the automaker. Insurance servers 700A, 700B, 700C, . . . are referred to as an "insurance server 700" below when they are not distinguished from one another. Each insurance server 700 manages information on the insurance service.

In the lease service, a plurality of lease types including a partial lease type and a full lease type are adopted. The partial lease type refers to a lease type for lease only of a power storage for a vehicle. A user who leases the power storage in accordance with the partial lease type prepares by the user himself/herself, a portion (body portion) of the vehicle except for the power storage. The user can mount the power storage leased from the leasing company on the body owned by the user himself/herself. As the power storage is mounted on the body, the xEV can travel. When a partial lease contract is terminated, the user returns only the power storage to the leasing company. The full lease type, on the other hand, refers to a lease type for lease of the entire vehicle (that is, both of a body portion and a power storage). When a full lease contract is terminated, the user returns not only the power storage but also the entire vehicle to the leasing company.

Dealer 100 includes a server 150. The automaker sells or leases a vehicle through dealer 100. The automaker may lease the power storage, without dealer 100 being interposed. Dealer 100 not only sells vehicles manufactured by the automaker but also provides the lease service described previously. Server 150 manages information (vehicle information) on the vehicle sold or leased by dealer 100 as being distinguished based on a vehicle ID. Server 150 then transmits latest vehicle information to management center 500 in response to a request from management center 500 or each time the vehicle information is updated. Dealer 100 may lease a power storage 12A of a vehicle 10A shown in FIG. 1 to a user, for example, in accordance with the partial lease type. In this case, vehicle 10A corresponds to a partial lease vehicle (which may be denoted as a "vehicle A" below) and a body 11A of vehicle 10A is a property of the user. Power storage 12A of vehicle 10A is provided to the user by lease and it is a property of the automaker. Alternatively, dealer 100 may lease a vehicle 10B shown in FIG. 1 to a user, for example, in accordance with the full lease type. In this case, vehicle 10B corresponds to a full lease vehicle (which may be denoted as a "vehicle B" below). The entire vehicle 10B (a body 11B and a power storage 12B) is provided to the user by lease and it is a property of the automaker. Dealer 100 may sell, for example, a vehicle 10C shown in FIG. 1 to a user. In this case, vehicle 10C corresponds to a sold vehicle (which may be denoted as a "vehicle C" below). The entire vehicle 10C (a body 11C and a power storage 12C) is sold to the user and becomes a property of the user.

In this embodiment, a lease fee (for example, a monthly lease fee) charged by dealer 100 to a vehicle user includes an insurance fee. The vehicle leased by dealer 100 is covered by the battery insurance provided by insurance server 600. Specifically, a damage to the power storage mounted on each of vehicles A and B is covered by the insurance. The insurance service compensates for the damage to the power storage.

BSta 200 is configured to replace the power storage for the vehicle (for example, for the xEV). BSta 200 includes a server 250. In this embodiment, a battery (more specifically, a secondary battery) is adopted as the power storage. The power storage should only be an apparatus where electric power can be stored, and examples of the power storage include a large-capacity capacitor other than the secondary battery.

The power storage management system according to this embodiment includes a plurality of BSta's 200. These BSta's 200 are provided at bases in an area (management area) managed by the management system so as to construct a network of battery replacement bases that covers the entire management area. Each BSta 200 may function as a vehicle repair garage. Each BSta 200 may be configured to repair the body. Though FIG. 1 shows only a single dealer 100, the management system may include a plurality of dealers 100. These dealers 100 may be provided at bases in the management area so as to construct a network of sales/lease bases that covers the entire area managed by the management system. Dealer 100 and BSta 200 may be provided at the same location (or in the vicinity).

Management center 500 includes a processor 510, a storage 520, and a communication module 530. Insurance server 600 includes a processor 610, a storage 620, and a communication module 630. Each of processors 510 and 610 includes, for example, a central processing unit (CPU). Each of storages 520 and 620 is configured such that information put thereinto can be stored therein. Each of storages 520 and 620 may include a hard disk (HD) drive or a solid state drive (SSD). Each of communication modules 530 and 630 is connected to a communication network NW, for example, through a wire. Though FIG. 1 does not show a configuration of insurance server 700, insurance server 700 is also similar in hardware configuration to insurance server 600.

Each of servers 150 and 250 is also connected to communication network NW, for example, through a wire. Management center 500, insurance servers 600 and 700, server 150, and server 250 are configured to communicate with one another over communication network NW. Communication network NW is a wide range network constructed, for example, of the Internet and a wireless base station. Communication network NW may include a cellular network.

Figure 2:
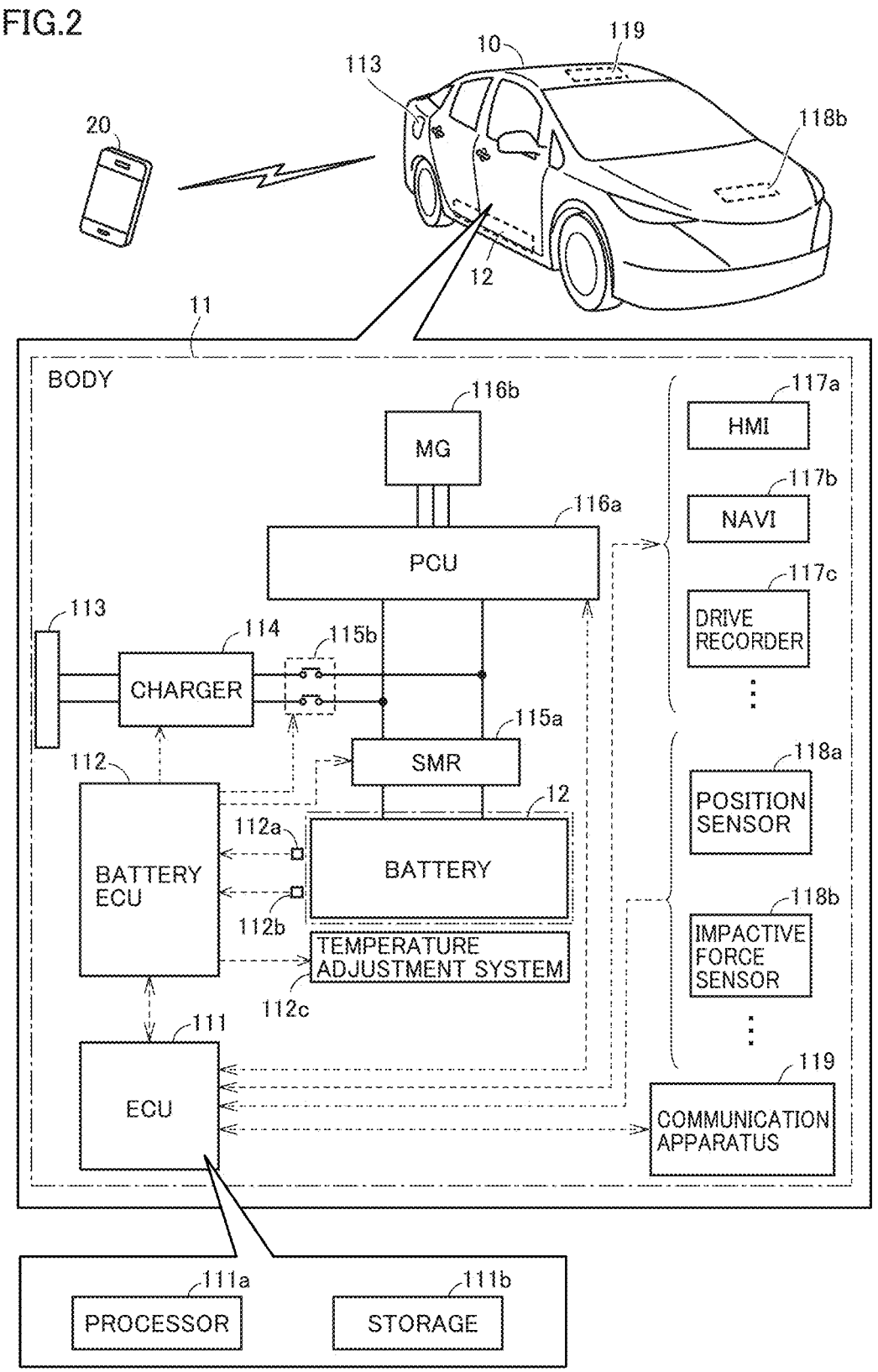
FIG. 2 is a diagram for illustrating a configuration of a vehicle shown in FIG. 1.

A vehicle provided by dealer 100 may be referred to as a "vehicle 10" below. Vehicle 10 according to this embodiment is one of vehicles A, B, and C shown in FIG. 1. FIG. 2 is a diagram for illustrating a configuration of vehicle 10.

Referring to FIG. 2, vehicle 10 includes body 11 and battery 12 mounted on body 11. Vehicle 10 is configured to travel with electric power in battery 12. Vehicle 10 is, for example, a BEV without including an internal combustion engine. A known power storage for a vehicle (for example, a liquid secondary battery or an all-solid-state secondary battery) can be adopted as battery 12. Examples of the secondary battery for the vehicle include a lithium ion battery and a nickel metal hydride battery. A plurality of secondary batteries may form a battery assembly. Battery 12 corresponds to an exemplary "power storage" according to the present disclosure.

Body 11 includes an ECU 111, a battery ECU 112, a battery management system (BMS) 112a, a strain sensor 112b, a temperature adjustment system 112c, an inlet 113, a charger 114, a system main relay (SMR) 115a, a charging relay 115b, a power control unit (PCU) 116a, a motor generator (MG) 116b, a human machine interface (HMI) 117a, a navigation system (which is denoted as "NAVI" below) 117b, a drive recorder 117c, a position sensor 118a, an impactive force sensor 118b, and a communication apparatus 119. The ECU stands for an electronic control unit. A control system including each ECU mounted on body 11 is supplied with electric power from a not-shown auxiliary battery.

ECU 111 is a computer including a processor 111a and a storage 111b. Not only a program to be executed by processor 111a but also information (for example, a map, a mathematical expression, and various parameters) used in the program are stored in storage 111b. Various types of information on vehicle 10 are further held in storage 111b. Such information is updated in accordance with a status of vehicle 10. Though FIG. 2 does not show a configuration of battery ECU 112, battery ECU 112 is also a computer similar in hardware configuration to ECU 111. ECU 111 and battery ECU 112 are configured to communicate with each other. These ECUs are connected to each other, for example, over controller area network (CAN).

Battery management system (BMS) 112a includes a sensor that detects a state (for example, a temperature, a current, and a voltage) of battery 12. Strain sensor 112b detects a degree of strain of a casing of battery 12 (battery casing). As impactive force applied to battery 12 is greater, a degree of strain of the battery casing is higher. Strain sensor 112b may be implemented by a strain gauge or a displacement sensor. A result of detection by each of BMS 112a and strain sensor 112b is outputted to battery ECU 112.

Temperature adjustment system 112c adjusts a temperature of battery 12. Temperature adjustment system 112c may include at least one of a heater and a cooling apparatus. Cooling may be water cooling. Temperature adjustment system 112c is controlled by battery ECU 112.

Vehicle 10 is configured as being externally chargeable (charging of battery 12 with electric power from the outside of the vehicle). Inlet 113 is constructed such that a plug (for example, a connector of a charging cable) of electric vehicle supply equipment (EVSE) is attachable thereto and removable therefrom. Charger 114 includes a power conversion circuit for external charging. Charger 114 may include at least one of a direct-current (DC)/DC conversion circuit and an alternating-current (AC)/DC conversion circuit. Charging relay 115b switches between connection and disconnection of a charging line. In the example shown in FIG. 2, the charging line including inlet 113, charger 114, and charging relay 115b is connected between SMR 115a and PCU 116a. Without being limited as such, the charging line may be connected between battery 12 and SMR 115a. The configuration shown in FIG. 2 may be modified to carry out external power feed (power feed from battery 12 to the outside of the vehicle). For example, charger 114 shown in FIG. 2 may be changed to a charger-discharger.

SMR 115a switches between connection and disconnection of an electrical path from battery 12 to PCU 116a. While vehicle 10 travels, SMR 115a is connected and charging relay 115b is disconnected. When electric power is exchanged between battery 12 and inlet 113, both of SMR 115a and charging relay 115b are connected. Each of charger 114, SMR 115a, and charging relay 115b is controlled by battery ECU 112. Battery ECU 112 receives a control command from ECU 111.

PCU 116a drives MG 116b with electric power supplied from battery 12. PCU 116a includes, for example, an inverter and a DC/DC converter. PCU 116a is controlled by ECU 111. MG 116b functions as a motor for travel of vehicle 10. MG 116b is driven by PCU 116a and rotates a drive wheel of vehicle 10. MG 116b carries out regeneration and outputs generated electric power to battery 12. Vehicle 10 may include any number of motors for travel.

HMI 117a includes an input device and a display device. HMI 117a may include a touch panel display. HMI 117a may include a meter panel and/or a head-up display. HMI 117a may include a smart speaker that accepts an audio input.

NAVI 117b includes a touch panel display, a global positioning system (GPS) sensor, a processor, and a storage where map information is stored. The map information indicates a position of each dealer 100 and a position of each BSta 200. The map information may sequentially be updated by over the air (OTA). NAVI 117b detects a position of vehicle 10 with the GPS sensor, and shows the position of vehicle 10 in real time on the map based on the map information. NAVI 117b searches for a route for finding an optimal route (for example, a shortest route) from the current position to a destination of vehicle 10 by referring to the map information.

Drive recorder 117c includes a camera that obtains video images of surroundings of vehicle 10, a storage where the video images obtained by the camera are stored, and an acceleration sensor (G sensor) that detects an acceleration of vehicle 10. Drive recorder 117c constantly records the video images of the surroundings of vehicle 10. When an amount of information of the video images recorded in the storage exceeds a capacity of the storage, old video images are erased by overwriting with latest video images. Therefore, video images to be stored for a long time (for example, accident data which will be described later) among video images obtained by drive recorder 117c are stored in ECU 111 (storage 111b).

Position sensor 118a detects a position of vehicle 10. Impactive force sensor 118b detects impactive force applied to body 11 (for example, a body shell). Impactive force sensor 118b may be configured to detect impactive force with at least one of the acceleration sensor, the strain gauge, and the displacement sensor.

Communication apparatus 119 includes a communication interface (I/F) for access to communication network NW through wireless communication. Communication apparatus 119 may include a telematics control unit (TCU) or a data communication module (DCM) for wireless communication. Communication apparatus 119 further includes a communication I/F for wireless communication with each of server 250 and portable terminal 20. ECU 111 is configured to communicate with each of management center 500, server 250, insurance servers 600 and 700, and portable terminal 20 through communication apparatus 119. ECU 111 may communicate with server 150 through communication apparatus 119.

Portable terminal 20 is configured as being portable by the user. Portable terminal 20 is operated while it is carried by the user (vehicle manager) of vehicle 10. In this embodiment, a smartphone equipped with a touch panel display is adopted as portable terminal 20. The smartphone contains a computer and performs a speaker function. Without being limited as such, any terminal portable by the user of vehicle 10 can be adopted as portable terminal 20. For example, a laptop computer, a tablet terminal, a portable game console, a wearable device (a smartwatch, smartglasses, smart gloves, or the like), and an electronic key can also be adopted as portable terminal 20.

Application software (which is referred to as a "mobile app" below) for using a service provided by management center 500 is installed in portable terminal 20. With the mobile app, identification information (a terminal ID) of portable terminal 20 is registered in management center 500 in association with identification information (a vehicle ID) of corresponding vehicle 10. Portable terminal 20 can exchange information with management center 500 through the mobile app. Portable terminal 20 may be configured to communicate with each of insurance servers 600 and 700, server 250, and server 150 (FIG. 1).

In vehicle 10, ECU 111 carries out integrated control of the entire vehicle. ECU 111 obtains results of detection from various sensors (including position sensor 118a and impactive force sensor 118b) mounted on vehicle 10. ECU 111 obtains information also from each of battery ECU 112, HMI 117a, NAVI 117b, drive recorder 117c, and communication apparatus 119. Battery ECU 112 obtains a state (for example, a temperature, a current, a voltage, an SOC, and an SOH) of battery 12 based on an output from BMS 112a and outputs the obtained state of battery 12 to ECU 111. Vehicle information obtained by ECU 111 is stored in storage 111b. Vehicle 10 transmits the latest vehicle information to management center 500 together with the vehicle ID of the vehicle itself in response to a request from management center 500 or each time the vehicle information is updated. The vehicle ID may be a vehicle identification number (VIN).

The vehicle information held in vehicle 10 (storage 111b) includes battery information which will be described later.

The battery information held in vehicle 10 corresponds to information on battery 12 while it is mounted on vehicle 10. The battery information includes identification information (battery ID), owner information, specifications (for example, a capacity in an initial state, charging performance, and discharging performance), a state of charge (SOC), and a state of health (SOH).

The owner information in the battery information (battery owner information) indicates a battery owner (that is, the owner of battery 12). More specifically, the battery owner information includes identification information and contact information of the battery owner. The identification information of the battery owner includes information (for example, a name, a corporate name, an identification number, an identification sign, or the like) for specifying the owner of battery 12. The contact information of the battery owner includes information (for example, a communication address of a terminal of the battery owner) for contacting the battery owner.

In this embodiment, when a salesperson at dealer 100 sells or leases vehicle 10, the salesperson writes into each of a storage (not shown) of server 150 and storage 111b of vehicle 10, owner information (body owner information) of body 11 of vehicle 10, owner information (battery owner information) of battery 12 of vehicle 10, and insurance information of a body insurance or a car insurance that covers vehicle 10. Server 150 transmits the owner information and the insurance information to management center 500, and management center 500 has the owner information and the insurance information stored in storage 520. The owner information and the insurance information in accordance with a sales contract or a lease contract are written in each storage.

When the lease contract is concluded between the leasing company (automaker) and the user of vehicle 10 (vehicle user), lease information indicating contents of the lease contract may further be stored in each of storage 111b of vehicle 10 and storage 520 of management center 500. The lease information indicates under which of vehicles A and B vehicle 10 falls. The lease information not being stored in each storage in such a form means that vehicle 10 falls under vehicle C.

The body owner information includes identification information of a body owner. The battery owner information includes identification information and contact information of a battery owner. Specifically, for vehicle A (partial lease vehicle), the identification information in each of the body owner information and the battery owner information indicates that the owner of body 11 is the vehicle user and the owner of battery 12 is the automaker. For vehicle B (full lease vehicle), the identification information in each of the body owner information and the battery owner information indicates that the owner of each of body 11 and battery 12 is the leasing company (automaker). For any of vehicles A and B, the contact information in the battery owner information indicates a communication address of management center 500 as a contact of the battery owner. Management center 500 corresponds to the terminal of the automaker (the owner of battery 12).

For vehicle C (sold vehicle), the identification information in each of the body owner information and the battery owner information indicates that the owner of each of body 11 and battery 12 is the vehicle user. The contact information in the battery owner information indicates a communication address of portable terminal 20 as a contact of the battery owner. Portable terminal 20 corresponds to the terminal of the user of vehicle 10 (the owner of battery 12).

The insurance information is information on the body insurance or the car insurance that covers vehicle 10. The insurance information includes, for example, identification information and contact information of the insurance company that provides the body insurance or the car insurance that covers vehicle 10. The identification information of the insurance company indicates, for example, a name of the insurance company. The contact information of the insurance company indicates, for example, a communication address of the terminal (one of insurance servers 700A, 700B, 700C, . . . ) of the insurance company. The insurance information may further include information indicating at least one of an insurance coverage period and an insurance coverage eligibility condition of the body insurance or the car insurance that covers vehicle 10. For vehicle A (partial lease vehicle), the vehicle user may make a contract of the body insurance with the insurance company. For vehicle B (full lease vehicle), the leasing company may make a contract of the body insurance or the car insurance with the insurance company. For vehicle C (sold vehicle), the vehicle user may make a contract of the car insurance with the insurance company.

The SOC represents a remaining amount of stored power, and corresponds to a ratio of a current amount of stored power to an amount of stored power in a fully charged state.

The SOH represents a level of health or a degree of deterioration. Examples of the SOH include a capacity retention ratio and an internal resistance. A higher internal resistance of the power storage means a higher degree of deterioration of the power storage. A lower capacity retention ratio of the power storage means the higher degree of deterioration of the power storage. The capacity retention ratio of the power storage corresponds to a ratio of a current capacity of the power storage to the capacity of the power storage in the initial state (a state where the power storage is not deteriorated). The capacity of the power storage corresponds to the amount of stored power in the fully charged state.

When vehicle 10 is involved in an accident, accident data indicating a situation of vehicle 10 at that time is stored in storage 111b. The accident data may include video images showing the situation of vehicle 10 on the occurrence of the accident. Such video images are obtained, for example, by drive recorder 117c, and stored in storage 111b when vehicle 10 is involved in the accident.

Referring again to FIG. 1, the power storage management system according to this embodiment includes a plurality of dealers 100, a plurality of BSta's 200, and a plurality of vehicles 10. The management system further includes a plurality of portable terminals 20 carried by users of vehicles 10. Management center 500 is configured to communicate with each of server 150 of dealer 100 provided at each base and server 250 of the battery replacement station (BSta 200) provided at each base. Management center 500 is configured to communicate also with each vehicle 10 sold or leased by any dealer 100 and portable terminal 20 corresponding to each vehicle 10.

Identification information (vehicle ID) of each vehicle 10 sold or leased by dealer 100 at each base is registered in advance in management center 500. Information on each vehicle 10 (vehicle information) is stored in storage 520 of management center 500 as being distinguished based on the vehicle ID. A latest value of a parameter that changes over time in the vehicle information is sequentially transmitted from each vehicle 10 to management center 500, and transition of such a parameter value is recorded in management center 500. In order to lower a frequency of communication, each vehicle 10 may collectively transmit data (for example, each parameter value recorded in association with time) recorded during a certain period to management center 500 when that period elapses. Management center 500 obtains the battery information described previously from each vehicle 10.

The vehicle information held in management center 500 includes use form information and fee information which will be described below, in addition to the battery information described previously.

The use form information represents a form of use of vehicle 10. In this embodiment, the use form information represents the form of use of any of vehicle A (partial lease vehicle), vehicle B (full lease vehicle), and vehicle C (sold vehicle). For example, when dealer 100 sells or leases vehicle 10, it writes the use form information of vehicle 10 into a storage (not shown) of server 150. Server 150 then transmits to management center 500, the use form information together with the vehicle ID.

The fee information corresponds to information on a lease fee paid by a vehicle user to the leasing company (automaker). The lease fee corresponds to the fee paid by the user for leased use of the vehicle or the battery. In this embodiment, the lease fee includes an insurance fee of the battery insurance. In other words, the vehicle user who has paid the lease fee has the right of coverage by the battery insurance described previously.

Figure 3:
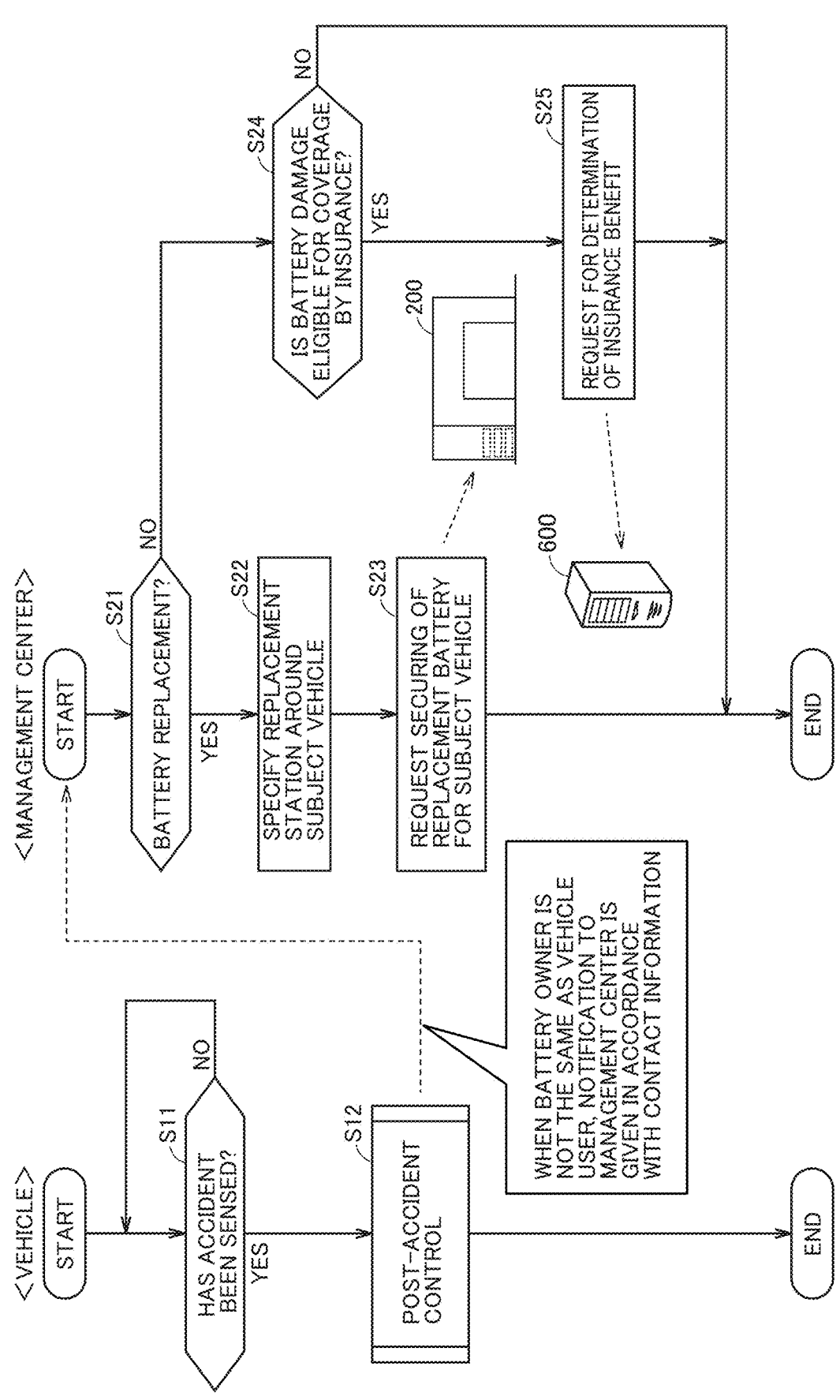
FIG. 3 is a flowchart showing control on the occurrence of an accident in a method of managing a power storage according to the embodiment of the present disclosure.

FIG. 3 is a flowchart showing control on the occurrence of an accident in a method of managing a power storage according to this embodiment. Each step in the flowchart is simply denoted as "S" below.

For example, when ECU 111 of vehicle 10 is started up, started-up ECU 111 starts processing in S11 which will be described below. ECU 111 is started up, for example, in response to an operation onto a start-up switch of vehicle 10. In general, the start-up switch is referred to as a "power switch," an "ignition switch," or the like. The processing in S11 and S12 is performed for any period. For example, ECU 111 may perform such processing only while vehicle 10 is traveling. In the processing shown in FIG. 3, vehicle 10 that performs the processing in S11 and S12 is referred to as a "subject vehicle."

Referring to FIG. 3 together with FIGS. 1 and 2, in S11, ECU 111 of the subject vehicle determines whether or not the subject vehicle has been involved in an accident. For example, when impactive force detected by impactive force sensor 118b exceeds a prescribed threshold value (which is denoted as "Th1" below), ECU 111 determines that the subject vehicle has been involved in the accident. In this case, accident data (for example, video images in drive recorder 117c) indicating the situation of the subject vehicle before and after the accident is stored in storage 111b. When impactive force detected by impactive force sensor 118b is equal to or smaller than Th1, on the other hand, ECU 111 determines that the subject vehicle has not been involved in the accident. When it is determined that the accident has not occurred (NO in S11), the process does not proceed to S12 or later and determination in S11 is repeated. The acceleration sensor of drive recorder 117c instead of impactive force sensor 118b may be used for detection of impactive force.

Figure 4:
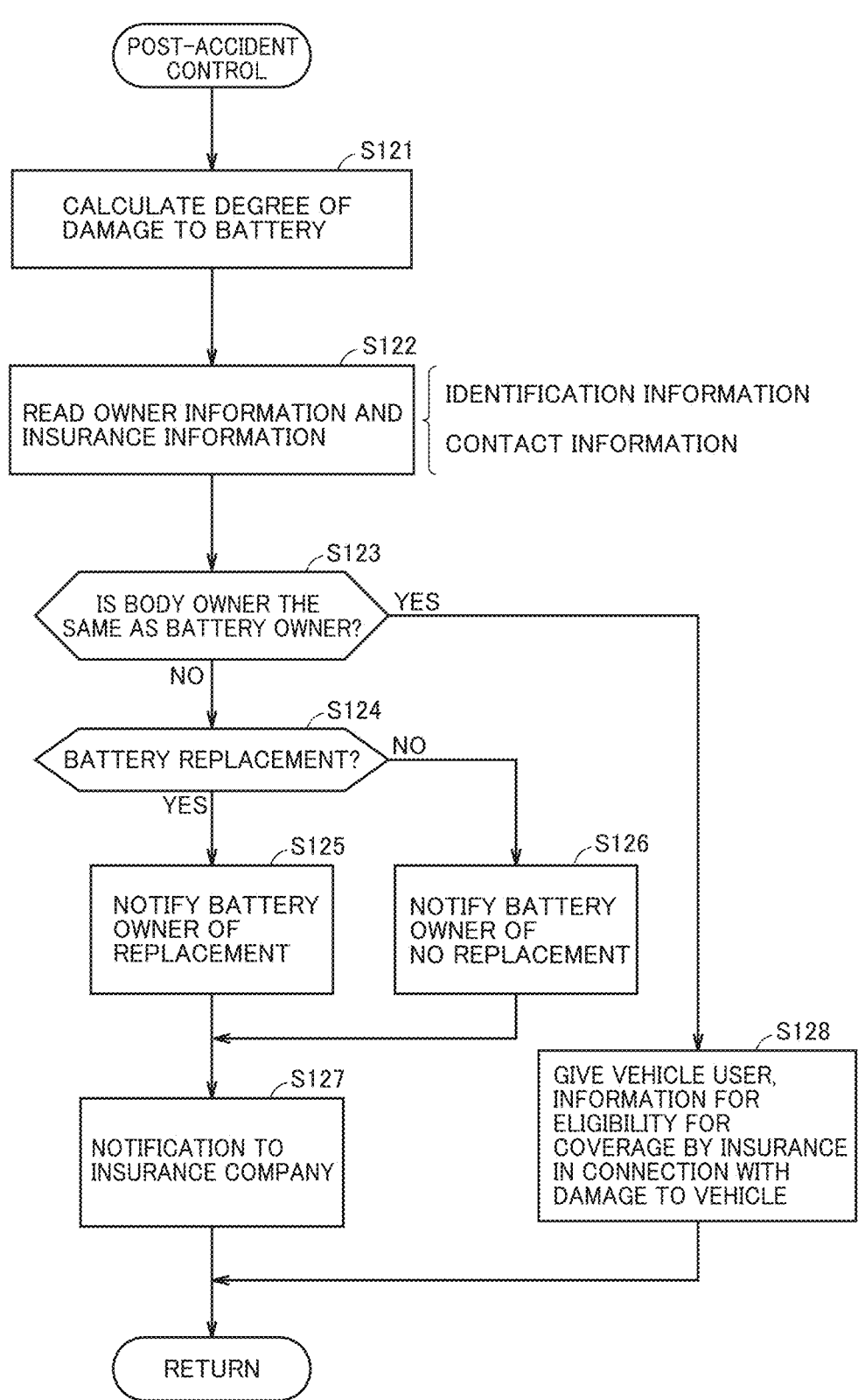
FIG. 4 is a flowchart showing processing involved with post-accident control performed by a vehicle involved in an accident, in control shown in FIG. 3.

When it is determined that an accident has occurred (YES in S11), in S12, ECU 111 of the subject vehicle carries out post-accident control. FIG. 4 is a flowchart showing details of S12.

Referring to FIG. 4 together with FIGS. 1 and 2, in S121, ECU 111 obtains a degree of damage to battery 12 mounted on the subject vehicle. In this embodiment, ECU 111 obtains the degree of damage to battery 12 based on at least one of a degree of a physical damage to the casing of battery 12 (for example, a degree of strain of the battery casing detected by strain sensor 112b), a communication level (for example, instability of communication, disconnection of communication, or the like) in connection with a system that monitors battery 12, a degree of damage to an electrical component (for example, break, deformation of a bus bar, or the like) of battery 12, and a degree of damage to an environmental system (for example, poor control, failure, or the like) of battery 12. In this embodiment, each of battery ECU 112 and BMS 112a functions as the system that monitors battery 12. Temperature adjustment system 112c functions as the environmental system of battery 12. ECU 111 may score the degree of damage for each assessment item in connection with the degree of damage to battery 12 and may handle a total value of scores for assessment items as the degree of damage (a result of assessment) of battery 12. The four assessment items (the casing, the communication level, the electrical component, and the environmental system) described above may be adopted as assessment items.

How to obtain the degree of damage to battery 12 is not limited to the method described above, and any method can be adopted. For example, ECU 111 may calculate the degree of damage to battery 12 caused by the accident based on change in characteristic (for example, a degree of lowering in capacity retention ratio or a degree of increase in internal resistance) of battery 12 between before and after the accident.

In succession, in S122, ECU 111 (more specifically, processor 111*a*) reads from storage 111*b*, the body owner information and the battery owner information of the subject vehicle and the insurance information of the body insurance or the car insurance that covers the subject vehicle. In succession, in S123, ECU 111 determines whether or not the owner of battery 12 is the same as the owner of body 11 based on the read body owner information and battery owner information. In this embodiment, the owner of body 11 corresponds to the user of the subject vehicle. ECU 111 specifies the owner of body 11 based on the identification information of the body owner and specifies the owner of battery 12 based on the identification information of the battery owner. ECU 111 thus determines whether or not the owner of battery 12 is the same as the owner of body 11 based on the owner information of body 11 and the owner information of battery 12 stored in vehicle 10 (for example, storage 111*b*). Without being limited as such, ECU 111 may determine whether or not the owner of battery 12 is the same as the owner of body 11 based on the lease information of battery 12 stored in vehicle 10 (for example, storage 111*b*).

In this embodiment, when the subject vehicle falls under vehicle C, determination as YES is made in S123, and when the subject vehicle falls under vehicle A, determination as NO is made in S123. Determination as NO in S123 in this embodiment means that the owner of battery 12 is the leasing company (automaker), that is, battery 12 mounted on the subject vehicle is provided by the lease service.

When the owner of battery 12 is someone other than the owner of body 11 (NO in S123), in S124, ECU 111 determines whether or not to replace battery 12 mounted on the subject vehicle based on the degree of damage to battery 12 (S121). ECU 111 may determine whether or not battery 12 should be replaced based on magnitude of the degree of damage. In this embodiment, ECU 111 determines to replace battery 12 when the degree of damage to battery 12 exceeds a prescribed threshold value (which is denoted as "Th2" below). When the degree of damage to battery 12 is equal to or smaller than Th2, ECU 111 determines not to replace battery 12.

When it is determined to replace battery 12 (YES in S124), in S125, ECU 111 specifies the communication address of management center 500 (the terminal of the battery owner) based on the contact information of the battery owner (S122) and notifies management center 500 of replacement of battery 12 together with occurrence of the accident of the subject vehicle. Specifically, ECU 111 transmits to management center 500, a first accident notification signal including the identification information of the vehicle (the vehicle ID of the subject vehicle) involved in the accident, the position information on a location of occurrence of the accident, a battery replacement flag (=1) indicating "replacement," and the degree of damage to battery 12 (S121).

When it is determined not to replace battery 12 (NO in S124), on the other hand, in S126, ECU 111 specifies the communication address of management center 500 (the terminal of the battery owner) based on the contact information of the battery owner (S122) and notifies management center 500 of non-replacement of battery 12 together with occurrence of the accident of the subject vehicle. Specifically, ECU 111 transmits to management center 500, a second accident notification signal including the identification information of the vehicle (the vehicle ID of the subject vehicle) involved in the accident, the position information on the location of occurrence of the accident, the battery replacement flag (=0) indicating "no replacement," and the degree of damage to battery 12 (S121).

When processing in one of S125 and S126 is performed, in following S127, ECU 111 specifies the communication address of the terminal of the insurance company that provides the insurance (more specifically, the body insurance or the car insurance) that covers the subject vehicle based on the insurance information (S122) of the subject vehicle and notifies the terminal (one of insurance servers 700A, 700B, 700C, . . . ) of the insurance company, of occurrence of the accident of the subject vehicle. ECU 111 may transmit to the terminal of the insurance company, a signal including the identification information of the vehicle (the vehicle ID of the subject vehicle) involved in the accident, the position information on the location of occurrence of the accident, and information on the damage to the subject vehicle (for example, magnitude of impactive force applied to body 11). Insurance server 700 that receives the notification of occurrence of the accident from the subject vehicle may perform processing for providing the insurance service (for example, a notification to a person in charge in the insurance company).

The position information on the location of occurrence of the accident corresponds, for example, to information on the current position of the subject vehicle detected by position sensor 118*a*. A position detection method can be modified as appropriate. The GPS sensor of NAVI 117*b* instead of position sensor 118*a* may be used for position detection. ECU 111 of the subject vehicle may request an emergency vehicle (for example, at least one of an ambulance, a fire engine, a tow car, and a police vehicle) that deals with the accident to be deployed as necessary when occurrence of the accident is sensed (YES in S11 in FIG. 3).

When the owner of battery 12 is the same as the owner of body 11 (YES in S123), in S128, ECU 111 gives the user of the subject vehicle, information for eligibility for coverage by the insurance service in connection with the damage to the subject vehicle caused by the accident. The user of the subject vehicle is more readily eligible for coverage by the insurance service.

Specifically, ECU 111 specifies the communication address of a user terminal (for example, portable terminal 20) of the subject vehicle based on the contact information of the battery owner (S122). ECU 111 then transmits to portable terminal 20, the position information on the location of occurrence of the accident, magnitude of impactive force applied to body 11 (S11 in FIG. 3), the degree of damage to battery 12 (S121), and the insurance information of the subject vehicle (S122) and requests portable terminal 20 to show information for eligibility for coverage by the insurance service. In response to the request from ECU 111 (S128), portable terminal 20 shows, for example, the information received from ECU 111. Specifically, portable terminal 20 may show information indicating the position of the location of occurrence of the accident (for example, a map of the surroundings, a street address, or a landmark), information on the insurance that covers the subject vehicle (for example, at least one of the name of the insurance company, the contact of the insurance company, the insurance coverage period, and the insurance coverage eligibility condition), and information on the damage to the subject vehicle (for example, at least one of magnitude of impactive force applied to body 11 and the degree of damage to battery 12).

When processing in one of S127 and S128 is performed, post-accident control (S12 in FIG. 3) shown in FIG. 4 ends. When the owner of battery 12 mounted on the subject vehicle is someone other than the owner of body 11, the subject vehicle transmits the first accident notification signal (S125) or the second accident notification signal (S126) to management center 500.

As set forth above, the method of managing the power storage according to this embodiment includes determining whether or not the vehicle including the power storage (battery 12) has been involved in an accident (S11 in FIG. 3), determining whether the owner of the power storage is identical to the owner of the body (S123 in FIG. 4) when it is determined that the vehicle has been involved in the accident, notifying the terminal (management center 500) of the owner of the power storage, of occurrence of the accident of the vehicle including the power storage (S125 and S126 in FIG. 4) when the owner of the power storage is determined as not being identical to the owner of the body, and notifying the terminal of the insurance company that provides the insurance that covers the vehicle, of occurrence of the accident of the vehicle (S127 in FIG. 4). In general, at the time when the accident is dealt with, for the vehicle involved in the accident, it is estimated that the owner of the body is the same as the owner of the power storage. Therefore, when the owner of the body is not the same as the owner of the power storage, the power storage may be disposed of when the accident is dealt with, without knowledge of occurrence of the accident by the owner of the power storage. In this regard, according to the method, when the owner of the power storage included in the vehicle involved in the accident is not the same as the owner of the body, the owner (for example, the leasing company) of the power storage can be notified of occurrence of the accident. The insurance company that provides the insurance that covers the vehicle can be notified of occurrence of the accident.

Management center 500 that has received the first or second accident notification signal starts a series of processing from S21 to S25 which will be described below. When the owner of battery 12 mounted on the subject vehicle is the same as the owner of body 11, on the other hand, notification to management center 500 is not given. In this case, management center 500 does not perform the series of processing from S21 to S25.

Referring again to FIG. 3 together with FIGS. 1 and 2, in S21, management center 500 determines whether or not to replace battery 12 mounted on the subject vehicle. Specifically, when management center 500 receives the first accident notification signal (the notification of replacement) from the subject vehicle, it determines to replace battery 12, and when it receives the second accident notification signal (notification of non-replacement) from the subject vehicle, it determines not to replace battery 12.

When it is determined to replace battery 12 (YES in S21), in S22, management center 500 specifies at least one BSta 200 present around the subject vehicle based on the position information included in the first accident notification signal. At least one BSta 200 present around the subject vehicle may be a single BSta 200 closest to the subject vehicle or at least one BSta 200 present within a prescribed distance from the position of the subject vehicle.

In succession, in S23, management center 500 requests server 250 of BSta 200 specified in S22 to secure a power storage (replacement battery) that replaces battery 12 mounted on the subject vehicle. Specifically, management center 500 makes the request to server 250 by extracting information (for example, the battery ID and the specifications) on battery 12 of the subject vehicle from a database stored in storage 520 based on the identification information (vehicle ID) of the subject vehicle and transmitting a signal (which is also referred to as a "battery request signal" below) including the extracted battery information to server 250. Server 250 that has received this request checks whether or not inventory of replacement batteries requested by management center 500 is insufficient. When the inventory of the replacement batteries is insufficient, server 250 has the replacement battery (the power storage for the subject vehicle) secured in a warehouse nearby or another BSta 200.

As set forth above, when management center 500 receives the notification (first accident notification signal) of replacement of battery 12 (power storage) mounted on the subject vehicle, it requests at least one replacement station to secure the power storage that replaces battery 12 (S23). According to such a configuration, when replacement of battery 12 mounted on the subject vehicle is necessitated, BSta 200 more readily prepares the power storage for replacement (that is, the power storage compatible with the power storage mounted on the subject vehicle) early.

In processing in S23, management center 500 permits BSta 200 that has received the battery request signal to replace the power storage (battery 12) of the subject vehicle. The battery ID included in the battery request signal is registered in server 250. Battery replacement is thus reserved in server 250. Server 250 specifies a battery to be replaced based on the battery ID included in the battery request signal. When the battery is not replaced even after lapse of a prescribed period since reservation of battery replacement, the reservation is canceled.

When it is determined not to replace battery 12 (NO in S21), in S24, management center 500 determines whether or not battery 12 mounted on the subject vehicle is eligible for coverage by the insurance service (battery insurance). Specifically, management center 500 determines whether or not the insurance coverage eligibility condition is satisfied based on the second accident notification signal. In this embodiment, when the degree of damage (second accident notification signal) to battery 12 mounted on the subject vehicle exceeds a prescribed threshold value (which is denoted as "Th3" below), an insurance coverage eligibility condition is satisfied, and otherwise, the insurance coverage eligibility condition is not satisfied. Th3 represents the threshold value that defines the scope of coverage by the insurance, and may be defined in advance in an insurance contract. The degree of damage to battery 12 not exceeding Th3 means that the degree of damage has not reached an insurance eligibility coverage level. Th3 is smaller than Th2.

When the insurance coverage eligibility condition is satisfied, battery 12 is determined as being eligible for coverage by the insurance service (battery insurance) (YES in S24) and the process proceeds to S25. In S25, management center 500 requests insurance server 600 to determine insurance benefit. Specifically, management center 500 makes the request to insurance server 600 by transmitting to insurance server 600, a signal (which is also referred to as a "first request signal" below) including the identification information (vehicle ID) of the subject vehicle, the owner information (for example, the communication address of management center 500) of battery 12 mounted on the subject vehicle, and damage information indicating the degree of damage to battery 12 mounted on the subject vehicle. When the processing in S25 is performed, the series of processing from S21 to S25 by management center 500 ends.

When the insurance coverage eligibility condition is not satisfied, battery 12 is determined as not being eligible for coverage by the insurance service (battery insurance) (NO in S24), and the series of processing from S21 to S25 by management center 500 ends without the processing in S25 being performed. When the processing in S23 described previously is performed as well, the series of processing similarly ends. When it is determined to replace battery 12 (YES in S21), however, the damage to battery 12 is covered by the insurance service (battery insurance) because the degree of damage to battery 12 exceeds Th2 (see S124 in FIG. 4). In this embodiment, in replacement of battery 12, server 250 rather than management center 500 requests insurance server 600 to determine the insurance benefit (see FIG. 7 which will be described later).

Figure 5:
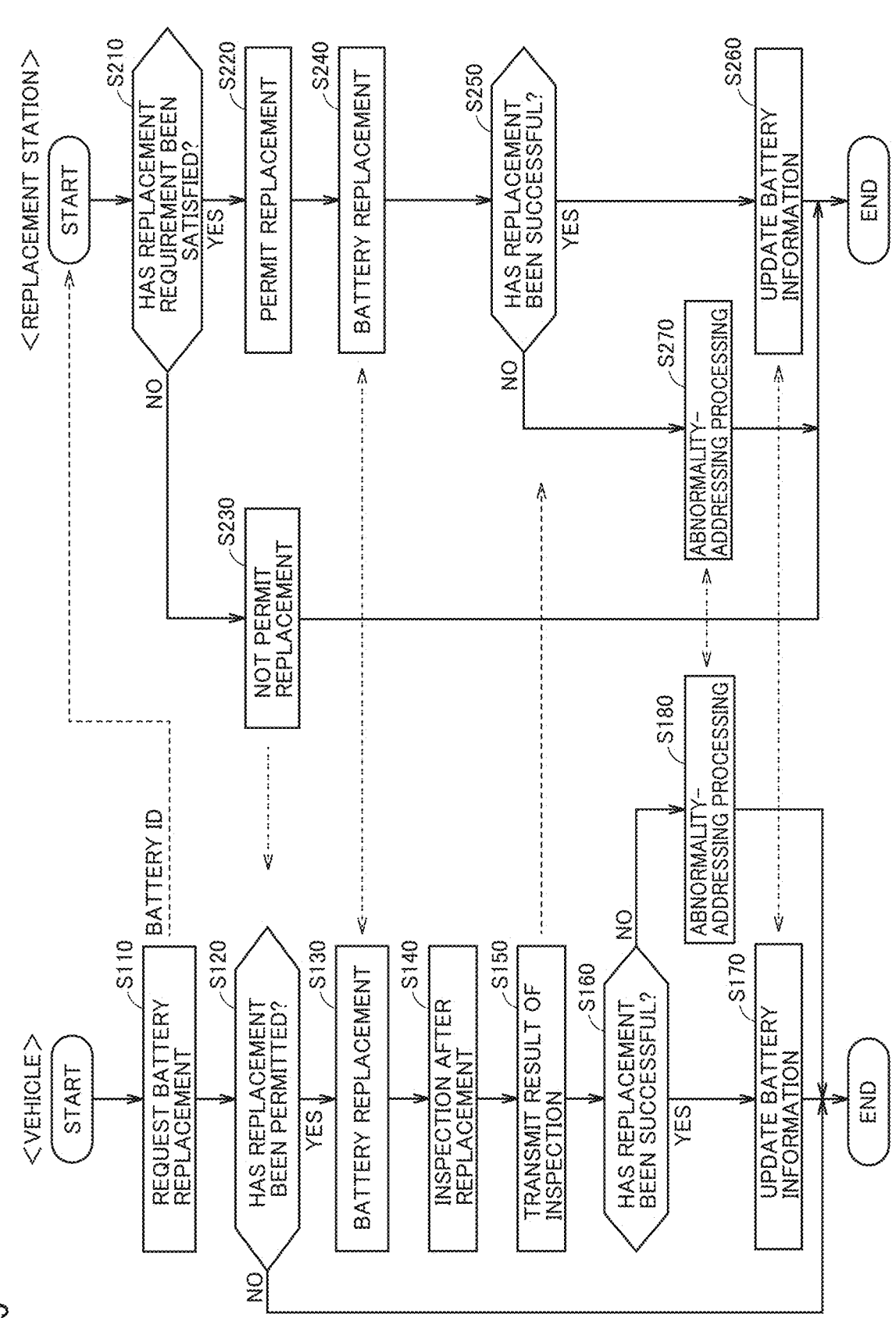
FIG. 5 is a flowchart showing processing involved with battery replacement performed by a vehicle and a replacement station terminal in the method of managing a power storage according to the embodiment of the present disclosure.

After the accident, the subject vehicle (the vehicle involved in the accident) arrives at BSta 200 (for example, BSta 200 closest to an accident site) present around the accident site by traveling by the vehicle itself or being carried by the tow car. Battery 12 mounted on the subject vehicle is then replaced at BSta 200. FIG. 5 is a flowchart showing processing involved with battery replacement performed by vehicle 10 and a battery replacement station terminal (server 250).

Referring to FIG. 5 together with FIGS. 1 and 2, a series of processing from S110 to S180 is performed by ECU 111 of the subject vehicle. A series of processing from S210 to S270 is performed by server 250. Server 250 is configured to wirelessly communicate with the subject vehicle and obtains battery information from the subject vehicle. Server 250 and the subject vehicle may establish short-range communication, for example, through a wireless local area network (LAN) or communicate over communication network NW.

After the subject vehicle arrives at BSta 200, in S110, it transmits a signal that requests battery replacement (which is also referred to as a "replacement request signal" below) to server 250. Yet-to-be-replaced battery 12 included in the subject vehicle is denoted as a "battery B1" below. The replacement request signal includes identification information (battery ID) of battery B1 mounted on the subject vehicle. The subject vehicle may make a request for battery replacement (S110) in accordance with an instruction from the user.

In S210, server 250 that has received the replacement request signal determines whether or not a prescribed replacement requirement is satisfied for the subject vehicle. Specifically, server 250 determines whether or not the replacement requirement is satisfied based on whether or not the battery ID received from the subject vehicle matches with the battery ID included in the battery request signal obtained from management center 500 (S23 in FIG. 3). In other words, when the battery ID of the subject vehicle has been registered (reserved), the replacement requirement is satisfied, and when the battery ID of the subject vehicle has not been registered (reserved), the replacement requirement is not satisfied.

When the replacement requirement is satisfied for the subject vehicle (YES in S210), in S220, server 250 sends a notification indicating permission to the subject vehicle and thereafter the process proceeds to S240. When the replacement requirement is not satisfied for the subject vehicle (NO in S210), on the other hand, in S230, server 250 transmits a notification indicating non-permission to the subject vehicle and thereafter the series of processing from S210 to S270 ends. In this case, the battery is not replaced.

After the subject vehicle transmits the replacement request signal (S110), it waits for a reply from server 250. When the subject vehicle then receives the reply from server 250, in S120, the subject vehicle determines whether or not battery replacement has been permitted. When the subject vehicle then receives the notification indicating permission (YES in S120), the process proceeds to S130. When the subject vehicle has received the notification indicating non-permission (NO in S120), on the other hand, the series of processing from S110 to S180 ends. In this case, the battery is not replaced.

In S130 and S240, the battery is replaced in a procedure which will be described later (see FIG. 6). The subject vehicle and server 250 may exchange information for battery replacement. Server 250 may obtain from the subject vehicle, information (for example, the specifications) on the battery mounted on the subject vehicle.

Battery 12 attached to the subject vehicle by battery replacement is denoted as a "battery B2" below. When replacement of the battery is completed, in S140, the subject vehicle inspects battery B2. In succession, in S150, the subject vehicle transmits a result of inspection to server 250. In succession, in S160, the subject vehicle determines whether or not the battery has successfully been replaced in accordance with the result of inspection. The subject vehicle determines that the battery has successfully been replaced unless abnormality (for example, defective connection or abnormal electrical performance) is found in the inspection, and determines that replacement of the battery has failed when abnormality is found in the inspection. Similarly, in S250, server 250 that has received the result of inspection also determines whether or not the battery has successfully been replaced in accordance with the result of inspection (normal/abnormal).

When the battery has successfully been replaced (YES in S160 and YES in S250), the subject vehicle and server 250 update the battery information held therein in S170 and S260, respectively, and thereafter the series of processing shown in FIG. 5 ends. When replacement of the battery has failed (NO in S160 and NO in S250), on the other hand, in S180 and S270, the subject vehicle and server 250 perform prescribed abnormality-addressing processing, respectively. The abnormality-addressing processing may include processing for notifying the user of the subject vehicle of failure in replacement of the battery. The abnormality-addressing processing may include processing for notifying management center 500 of failure in replacement of the battery. The abnormality-addressing processing may include processing for once detaching battery B2 attached to the subject vehicle from the subject vehicle and redoing replacement of the battery. After the abnormality-addressing processing is performed, the series of processing shown in FIG. 5 ends. The abnormality-addressing processing can freely be set.

Figure 6:
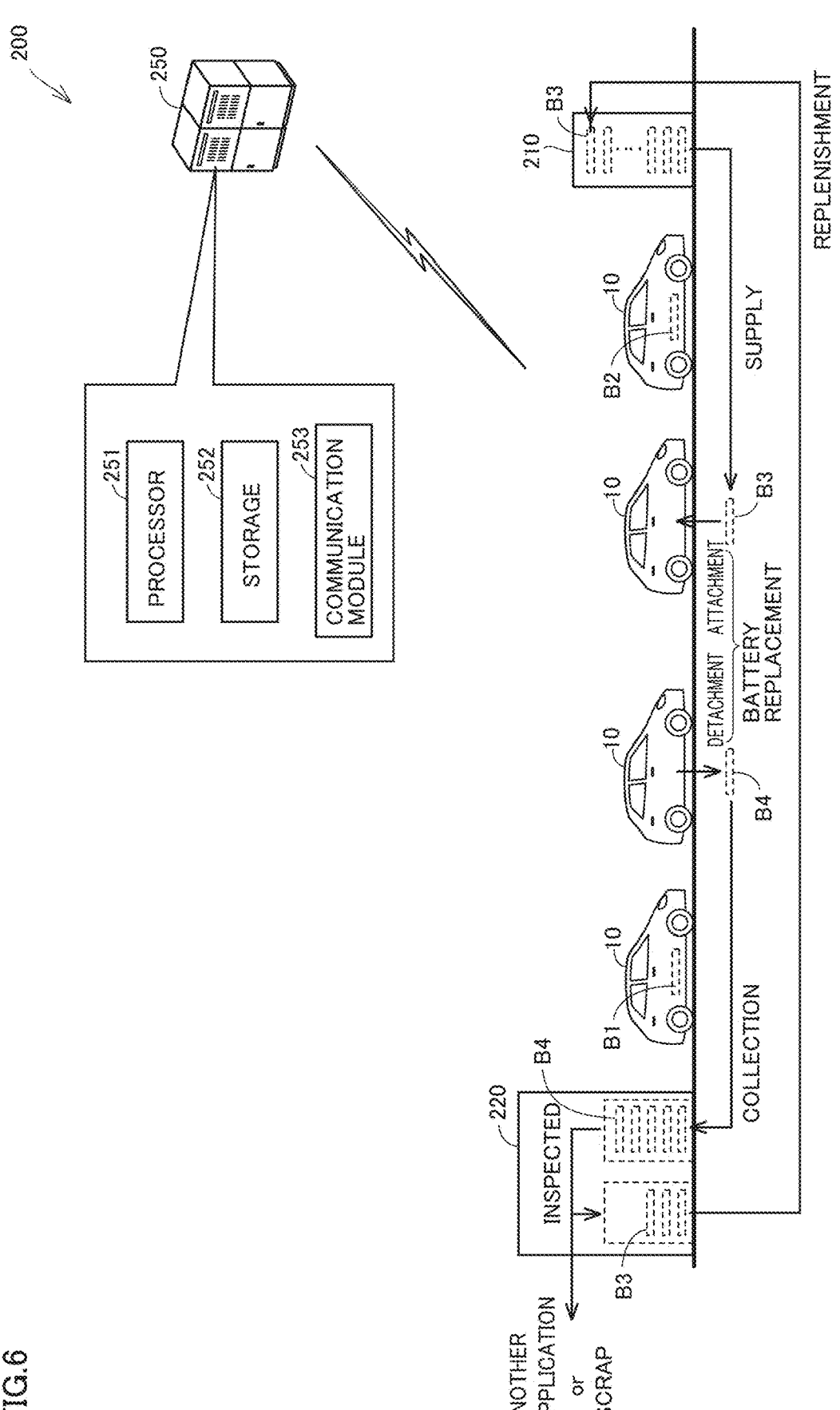
FIG. 6 is a diagram for illustrating a configuration and an operation of the replacement station included in the management system according to the embodiment of the present disclosure.

FIG. 6 is a diagram for illustrating a configuration and an operation of the battery replacement station (BSta 200) according to this embodiment.

Referring to FIG. 6 together with FIGS. 1 and 2, BSta 200 includes a storage apparatus 210, an inspection portion 220, and server 250. Storage apparatus 210 includes an accommodation portion (for example, a storage). Inspection portion 220 includes, for example, a charger-discharger, a measurement apparatus, and a categorization apparatus. BSta 200 further includes a transport apparatus that transports the power storage and a replacement apparatus that replaces the power storage. A type of transport may be a conveyor type or a type with the use of a delivery robot. Each of the transport apparatus and the replacement apparatus is controlled by server 250.

Server 250 includes a processor 251, a storage 252, and a communication module 253. Information on each battery present in BSta 200 is stored in storage 252 as being distinguished based on the identification information (battery ID) of the battery. The battery information held in server 250 includes, for example, specifications (for example, a capacity in an initial state, charging performance, and discharging performance), status information indicating a status of inspection, the SOH, and the SOC. The status information may indicate, for example, any status of yet-to-be-inspected, inspected (reuse), inspected (another application), inspected (scrap), and suppliable. Server 250 sequentially transmits information held therein to management center 500. The battery present in BSta 200 is a property of the automaker. A new battery may be supplied from a warehouse of the automaker to BSta 200 or a secondhand battery collected from vehicle 10 may be stored at BSta 200. The battery may be transported between a plurality of BSta's 200.

The subject vehicle is parked at a prescribed position in BSta 200, and thereafter requests server 250 to replace the battery (S110 in FIG. 5). In response to this request, server 250 starts control for battery replacement (S240 in FIG. 5). Server 250 has the battery of the subject vehicle replaced, for example, in a procedure as below.

Server 250 selects a battery (replacement battery) corresponding to battery B1 from among a plurality of batteries B3 accommodated in the accommodation portion of storage apparatus 210. Selected battery B3 is the same in specifications (for example, the capacity in the initial state, charging performance, and discharging performance) as battery B1. Battery B3, however, is lower in degree of deterioration than battery B1. The SOC of battery B3 is equal to or higher than a prescribed SOC value (for example, 50%).

In succession, the replacement apparatus detaches battery B1 from the subject vehicle. The battery detached from the subject vehicle is denoted as a "battery B4" below. In succession, the transport apparatus transports (supplies) battery B3 from storage apparatus 210 to the replacement apparatus. In succession, the replacement apparatus attaches supplied battery B3 to the subject vehicle. Battery replacement of the subject vehicle is thus completed.

FIG. 6 shows an example where detachment of the battery and attachment of the battery are performed at different locations. The subject vehicle may be transported from a detachment position to an attachment position by a not-shown transport apparatus (for example, a transport apparatus of a conveyor type). Without being limited as such, detachment of the battery and attachment of the battery may be performed at the same location. The battery may be replaced (detached and attached) while the subject vehicle is at a standstill (for example, a parked state).

Figure 7:
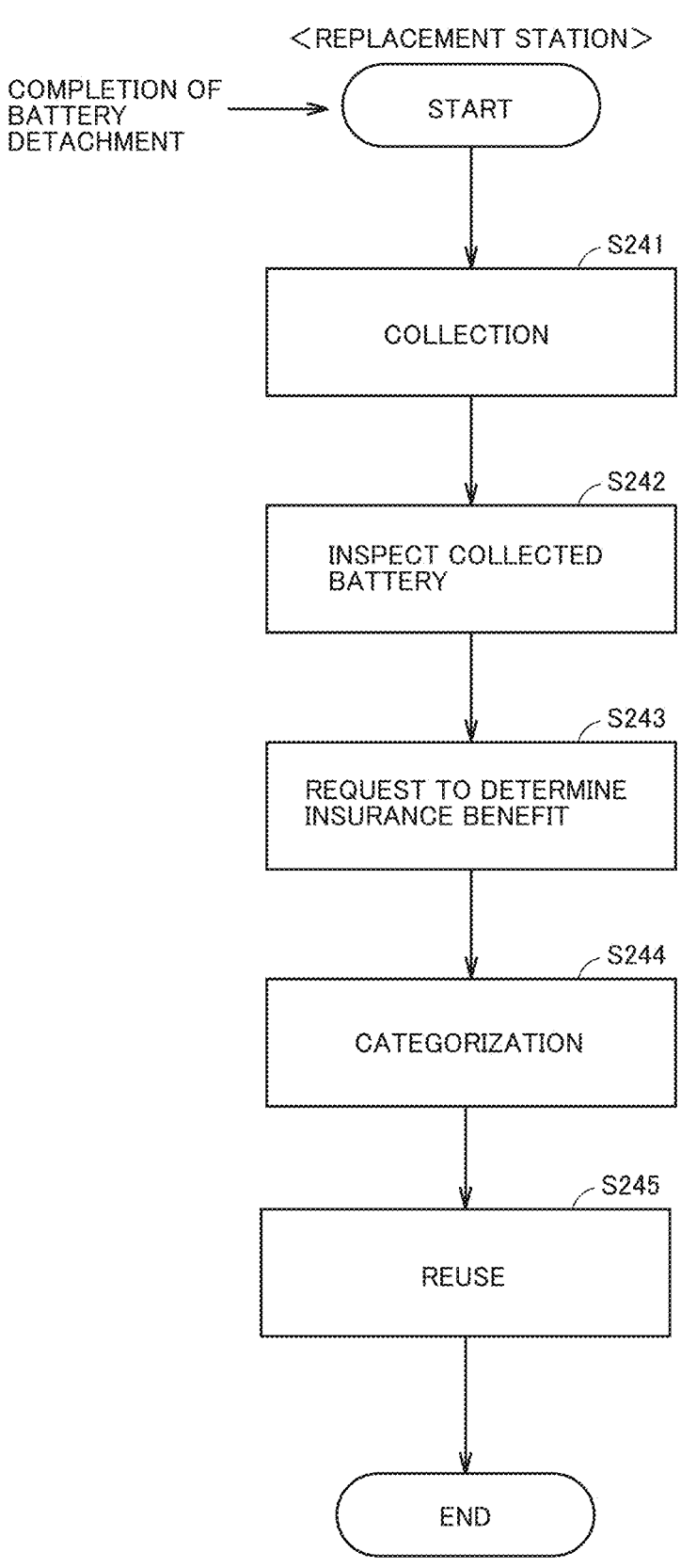
FIG. 7 is a flowchart showing a reuse process performed by the replacement station in the management method according to the embodiment of the present disclosure.

BSta 200 performs a process for reuse of battery B4 detached from the subject vehicle, in parallel to the battery replacement process above. When battery B4 is detached from the subject vehicle, server 250 starts control for reuse of the battery. The reuse process is performed, for example, in a procedure as shown in FIG. 7. FIG. 7 is a flowchart showing processing involved with control for reuse of the power storage performed by server 250. When battery 12 (battery B1) is detached from the subject vehicle in battery replacement control (S240 in FIG. 5) described above, server 250 starts a series of processing from S241 to S245 which will be described below.

Referring to FIG. 7 together with FIG. 6, in S241, the transport apparatus transports (collects) battery B4 detached from the subject vehicle to inspection portion 220. In succession, in S242, inspection portion 220 inspects collected battery B4. The charger-discharger and the measurement apparatus in inspection portion 220 conduct the inspection. Processing for recovery of the SOH may be performed on battery B4 before the inspection.

In the inspection, for example, the charger-discharger has battery B4 discharged until the SOC attains to a prescribed first SOC value (for example, the SOC value indicating an empty state) and thereafter it has battery B4 charged until the SOC attains to a prescribed second SOC value (for example, the SOC value indicating the fully charged state). The measurement apparatus includes various sensors, and measures a state (for example, a temperature, a current, and a voltage) of battery B4 during charging and/or discharging. The measurement apparatus then detects the SOH of battery B4 based on measurement data. The measurement apparatus may further include a camera for inspection of an appearance. The charger-discharger may repeat charging and discharging of battery B4 until the measurement apparatus obtains necessary inspection data.

When the inspection is completed, in S243, server 250 requests insurance server 600 to determine the insurance benefit. Specifically, management center 500 makes the request to insurance server 600 by transmitting to insurance server 600, a signal (which is also referred to as a "second request signal" below) including the identification information (vehicle ID) of the subject vehicle, the owner information (for example, the communication address of management center 500) of battery B4, and battery inspection information indicating a result of the inspection (S242). The battery inspection information includes, for example, at least one of appearance information (for example, video data or whether or not there is a flaw) on battery B4, charging characteristics (for example, a charging rising characteristic and maximum charging power), discharging characteristics (for example, a discharging rising characteristic and maximum discharging power), and the SOH (for example, the capacity retention ratio or the internal resistance).

In following S244, the categorization apparatus of inspection portion 220 categorizes battery B4 into a battery for reuse as a vehicle battery, a battery for use in another application (an application other than the application for the vehicle), and scrap, in accordance with a result of the inspection (S242). Examples of other applications may include stationary use. The categorization apparatus may categorize battery B4 having a significantly damaged appearance into a non-reusable battery (another application or scrap).

Battery B4 categorized as being reusable is handled as battery B3 described previously. After the categorization (S244), in S245, the transport apparatus transports battery B3 to storage apparatus 210. Storage apparatus 210 is replenished with transported battery B3. Inspected and charged battery B3 is thus set in storage apparatus 210. Without being limited as such, storage apparatus 210 may be configured to charge inspected battery B3. In S245, battery B4 categorized as "another application" is shipped for another application. Battery B4 categorized as "scrap" is scrapped in S245. The battery may be scrapped in any manner. In a process of scrap, the battery may be disassembled to a material level to collect a recyclable material (resource) for reuse of the material (resource recycle). When the processing in S245 is performed, the reuse process for battery B4 ends.

Figure 8:
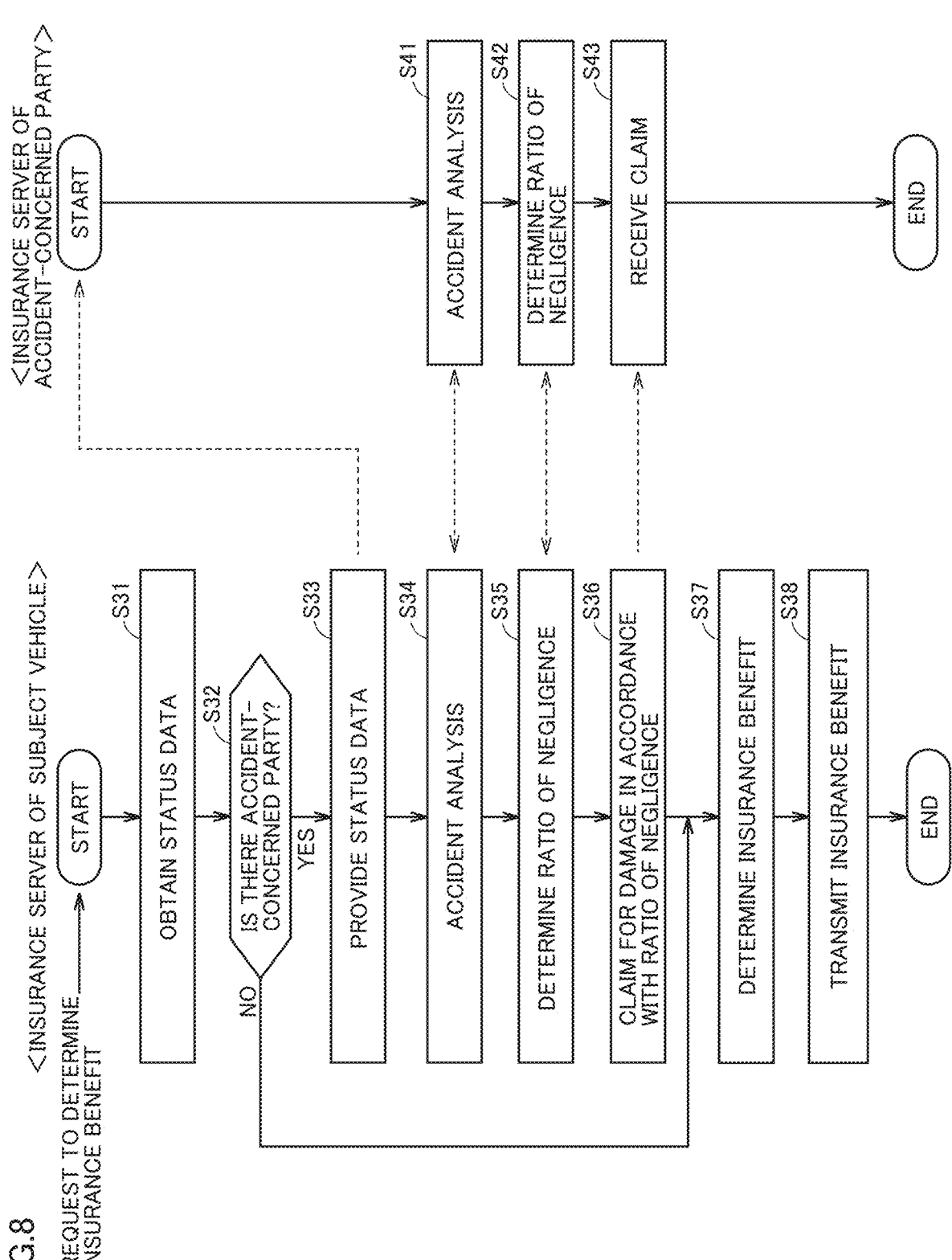
FIG. 8 is a flowchart showing processing involved with provision of an insurance service performed by an insurance server in the management method according to the embodiment of the present disclosure.

FIG. 8 is a flowchart showing processing involved with provision of the insurance service performed by insurance server 600 that has received a request to determine insurance benefit (S25 in FIG. 3 or S243 in FIG. 7).

Referring to FIG. 8 together with FIGS. 1 and 2, when insurance server 600 receives the first request signal (S25 in FIG. 3) or the second request signal (S243 in FIG. 7), it starts a series of processing from S31 to S38. In S31, insurance server 600 wirelessly communicates with the subject vehicle and obtains accident data indicating a situation of the subject vehicle on the occurrence of the accident from the subject vehicle. Insurance server 600 may communicate with the subject vehicle through management center 500. The accident data includes, for example, video images in drive recorder 117*c* that show the situation of the subject vehicle before and after the accident. In following S32, insurance server 600 determines whether or not there is a vehicle of an accident-concerned party based on the accident data. In the case of a single-car accident (single-vehicle accident), determination as NO (there is no vehicle of the accident-concerned party) is made in S32 and the process proceeds to S37 which will be described later.

When there is a vehicle of the accident-concerned party (YES in S32), in S33, insurance server 600 specifies a server of an insurance company (an insurance server of the accident-concerned party) that provides an insurance that covers the vehicle of the accident-concerned party and provides the accident data (S31) to the insurance server of the accident-concerned party. When insurance server 600 is unable to specify the insurance server of the accident-concerned party based on the accident data, it may request the user terminal (for example, portable terminal 20) of the subject vehicle to give information for specifying the insurance server of the accident-concerned party. Insurance server 600 may give a notification for explanation of circumstances to the insurance server of the accident-concerned party before it provides (transmits) the accident data.

The accident data is shared between insurance server 600 of the subject vehicle and the insurance server of the accident-concerned party in the processing in S33. Thereafter, the insurance servers analyze the accident based on the accident data (S34 and S41), and a ratio of negligence between both parties (the ratio of negligence between the user of the subject vehicle and the accident-concerned party) involved in the accident is determined based on a result of analysis of the accident (S35 and S42). As the ratio of negligence is higher, a degree of negligence is higher.

In succession, in S36, insurance server 600 determines an amount of claim for damage based on the ratio of negligence between both parties involved in the accident (S35), and claims to the insurance server of the accident-concerned party, the determined amount of claim for damage. Insurance server 600 may set the amount of claim for damage directed to the insurance server of the accident-concerned party to be smaller as the degree of negligence of the vehicle user in the accident (deterioration of the battery) is higher. The insurance server of the accident-concerned party receives the amount of claim for damage in S43.

In succession, in S37, insurance server 600 determines the insurance benefit to be paid by the insurance service based on the degree of damage (the first request signal) to battery 12 mounted on the subject vehicle (the vehicle involved in the accident) or the battery inspection information (second request signal). Insurance server 600 may totally compensate for an amount of loss of battery 12 with the insurance benefit. An upper limit (for example, an upper limit determined in the contract in advance) may be set for the amount of insurance benefit. When it is found based on the accident data that the user has intentionally damaged battery 12, insurance server 600 may determine this case as being ineligible for coverage by the insurance (no insurance benefit).

In following S37, insurance server 600 transmits to management center 500, a signal indicating the vehicle ID of the subject vehicle and the insurance benefit determined in S37. When the subject vehicle falls under vehicle B (full lease vehicle), the loss of the body portion may totally be compensated for with the insurance benefit, or the leasing company (automaker) may charge the vehicle user for at least some of the loss.

As described above, the method of managing the power storage according to this embodiment includes processing shown in FIGS. 3 to 5, 7, and 8. In this embodiment, ECU 111 corresponds to the exemplary "computer apparatus" according to the present disclosure. The processing is performed by execution by at least one processor, of a program stored in at least one memory. The processing, however, may be performed by dedicated hardware (electronic circuitry) rather than software.

Vehicle 10 according to this embodiment includes body 11, battery 12 (power storage) mounted on body 11, storage 111*b* where the owner information indicating the owner of battery 12 is stored, impactive force sensor 118*b* that detects impactive force applied to body 11, and processor 111*a* that performs the management method (including S11 and S12 in FIG. 3 and the series of processing shown in FIG. 4) for battery 12. Processor 111*a* determines whether or not the vehicle has been involved in an accident based on a result of detection by impactive force sensor 118*b* (S11 in FIG. 3). When processor 111*a* determines that vehicle 10 has been involved in the accident, it determines whether the owner of battery 12 is identical to the owner of body 11 based on the owner information read from storage 111*b* (S123 in FIG. 4). According to such vehicle 10, on the occurrence of a vehicle accident, whether or not the owner of battery 12 is the same as the owner of body 11 can properly be determined.

The insurance benefit in connection with the damage to the power storage may be calculated in a processing flow (see FIG. 8) common to vehicle A (partial lease vehicle) and vehicle B (full lease vehicle). Alternatively, the insurance benefit may be calculated in processing flows different for vehicle A and vehicle B. For example, when management center 500 receives the first or second accident notification signal, it may transmit information (for example, the use form information) indicating the lease type (partial lease/full lease) of the subject vehicle to insurance server 600. When insurance server 600 receives a request to determine the insurance benefit, it may perform the processing flow shown in FIG. 8 for vehicle A and perform another processing flow (not shown) for vehicle B. For vehicle B, insurance server 600 may provide an insurance service that compensates not only for the damage to the power storage but also for the damage to the body.

The processing shown in FIGS. 3 and 8 (S21 to S25 and S51 to S53) may be performed by server 150 (dealer terminal) instead of management center 500. Processing flows shown in FIGS. 3 to 5, 7, and 8 can be modified as appropriate. For example, depending on an object, the order of processing may be changed or an unnecessary step may be omitted. Contents in any processing may be modified. For example, in the processing shown in FIG. 4, S127 may be omitted.

Figure 9:
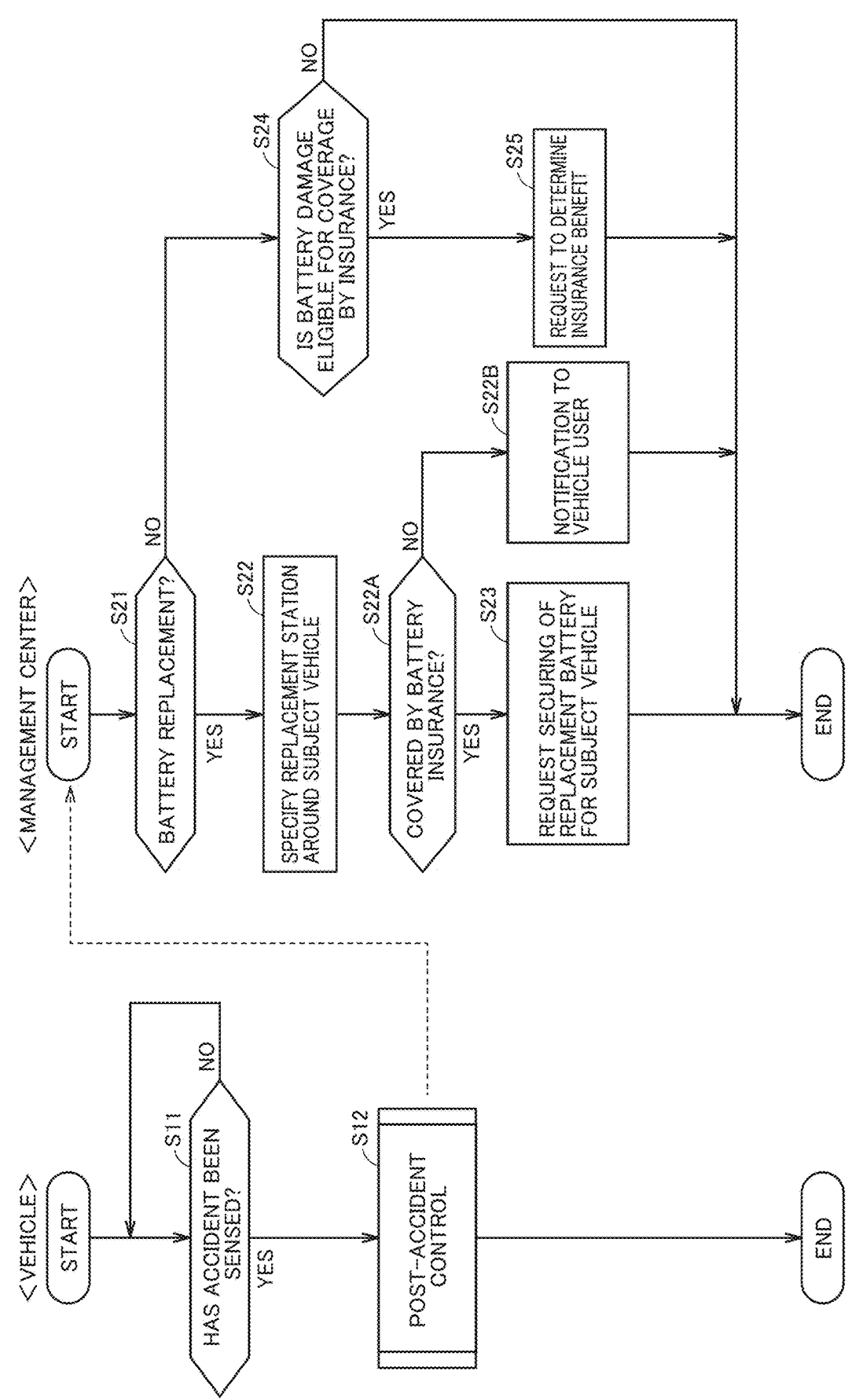
FIG. 9 is a flowchart showing a modification of processing shown in FIG. 3.

FIG. 9 is a flowchart showing a modification of the processing shown in FIG. 3. In a series of processing shown in FIG. 9, in S22A prior to S23, management center 500 that has received a notification (a notification of replacement) of replacement of battery 12 determines whether or not battery 12 included in vehicle 10 is covered by the insurance service. When battery 12 is covered by the insurance service, management center 500 requests BSta 200 (the replacement station that replaces the power storage for the vehicle) to secure a power storage that can replace battery 12 included in vehicle 10 through the processing in S23 (see FIG. 3) described previously. When battery 12 included in vehicle 10 is not covered by the insurance service, on the other hand, management center 500 performs processing in S22B instead of the processing in S23. In S22B, management center 500 notifies the vehicle user that vehicle 10 is not covered by the insurance of battery 12. In S22B, management center 500 may notify the vehicle user of a candidate for BSta 200 (replacement station) that holds inventories of battery 12 included in vehicle 10. The vehicle user that has received the notification can contact any BSta 200 to discuss an amount of fees or payment in connection with battery replacement, by operating the user terminal (for example, portable terminal 20 or HMI 117*a*) of vehicle 10.

Figure 10:
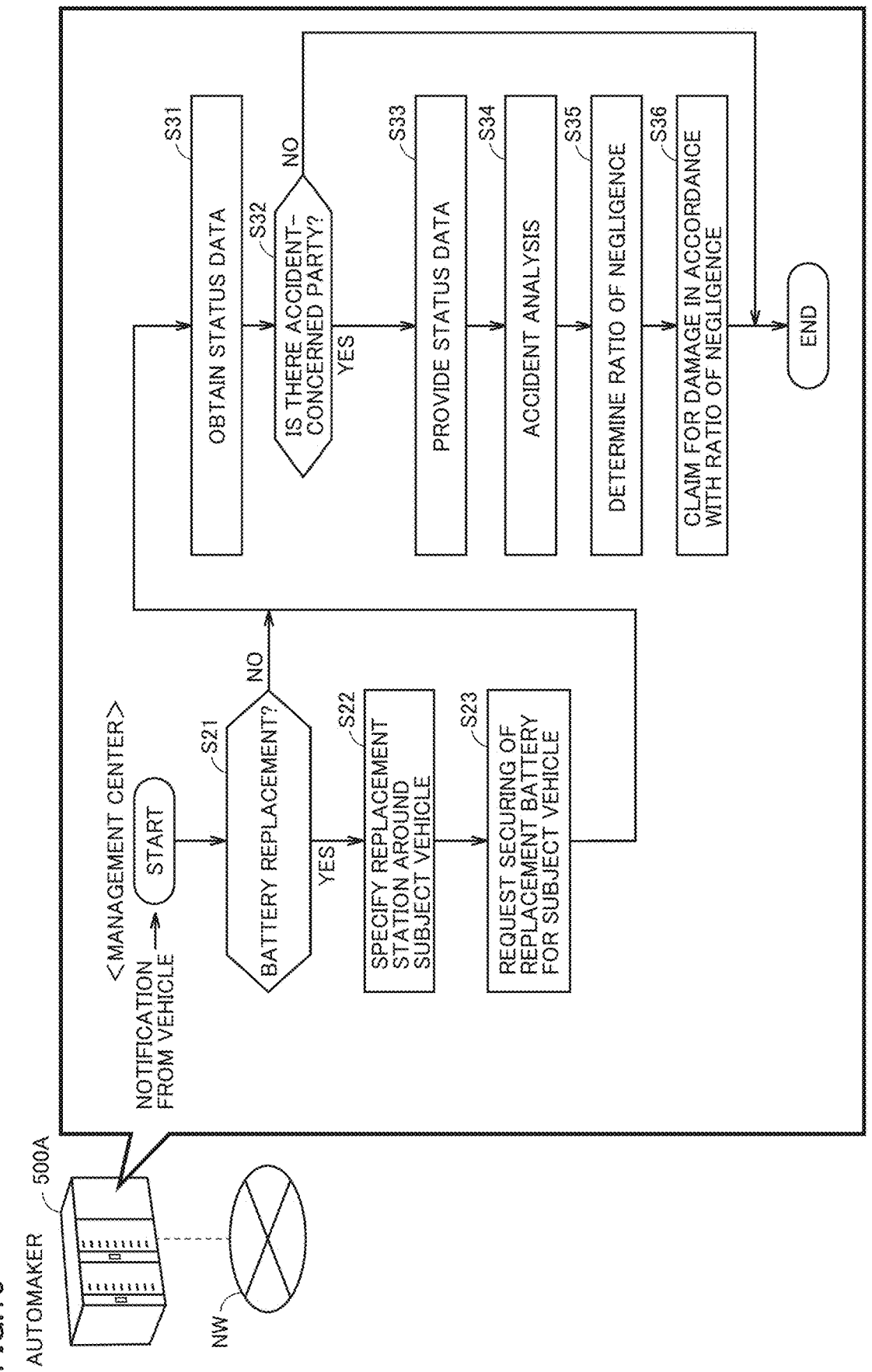
FIG. 10 is a diagram showing a modification of the system shown in FIG. 1.

The function of management center 500 and the function of insurance server 600 may be implemented on a single server. FIG. 10 is a diagram showing a modification of the system shown in FIG. 1. A management center 500A shown in FIG. 10 may be adopted instead of management center 500 and insurance server 600 shown in FIG. 1. Referring to FIG. 10, when management center 500A receives the first accident notification signal (S125 in FIG. 4) or the second accident notification signal (S126 in FIG. 4) from the subject vehicle, it performs the processing in S21 (see FIG. 3) described previously. When determination as YES is made in S21, management center 500A performs the processing in S22 and S23 (see FIG. 3) described previously and thereafter performs the processing in S31 to S36 (see FIG. 8) described previously. When determination as NO is made in S21, on the other hand, management center 500A performs the processing in S31 to S36 (see FIG. 8) described previously without performing the processing in S22 and S23 (see FIG. 3) described previously. Since management center 500A according to this modification provides the insurance service by battery replacement rather than by the insurance benefit, it does not perform the processing in S37 and S38 shown in FIG. 8.

In this embodiment, management center 500, insurance servers 600 and 700, server 150, and server 250 are each an on-premise server. Without being limited as such, the function of each server may be implemented on the cloud by cloud computing. In other words, these servers may be cloud servers. A location where the lease service is provided is not limited to dealer 100. For example, management center 500 may provide the lease service on-line (for example, on the cloud). Only a single lease type (for example, the partial lease type) may be provided.

Though only the battery is replaced in the embodiment, a battery pack including a battery and accessories thereof (for example, a BMS and a strain sensor) altogether may be replaced. The vehicle may be an xEV (electrically powered car) other than the BEV. The vehicle may include an internal combustion engine. The vehicle is not limited to a four-wheel passenger car, but may be a bus or a truck, or an xEV (electrically powered vehicle) with three wheels or at least five wheels. The vehicle may be provided with a solar panel. The vehicle may be configured to wirelessly be chargeable. The vehicle may be configured to be able to autonomous drive or may perform a flying function. The vehicle may be a vehicle (for example, a robo-taxi, an automated guided vehicle, or an agricultural machine) that can travel without human intervention.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A system comprising:
a vehicle; and
a server, wherein
the vehicle includes:
  a body;
  a power storage mounted on the body:
  a storage where owner information indicating an owner of the body and an owner of the power storage is stored;
  an impactive force sensor that detects impactive force applied to the body; and
  a processor, and
the processor is configured to:
  determine whether the vehicle has been involved in an accident, based on a result of detection by the impactive force sensor,
  determine whether the owner of the power storage is identical to the owner of the body based on the owner information read from the storage,
  determine whether the power storage mounted on the vehicle is to be replaced based on a degree of damage to the power storage,
  in response to determining that the vehicle has been involved in the accident and the owner of the power storage is identical to the owner of the body, perform display control of a user terminal of the vehicle,
  in response to determining that the vehicle has been involved in the accident, the owner of the power storage is not identical to the owner of the body, and the power storage mounted on the vehicle is to be replaced, transmit a first accident notification to the server, and
  in response to determining that the vehicle has been involved in the accident, the owner of the power storage is not identical to the owner of the body, and the power storage mounted on the vehicle is not to be replaced, transmit a second accident notification signal to the server,
the server is configured to control a replacement station configured to replace the power storage for the vehicle, and
the server is further configured to:
  control the replacement station to replace the power storage mounted on the vehicle upon receiving the first accident notification signal, and
  control the replacement station not to replace the power storage mounted on the vehicle upon receiving the second accident notification signal.

2. The system according to claim 1, wherein
the processor is further configured to, in response to determining that the vehicle has been involved in the accident and the owner of the power storage is not identical to the owner of the body, notify a terminal of an insurance company that provides an insurance that covers the vehicle, of an occurrence of the accident of the vehicle.

3. The system of managing a power storage according to claim 1, wherein the processor is further configured to control the user terminal, in the display control of the user terminal, to give a user of the vehicle, information for eligibility for coverage by an insurance service in connection with a damage to the vehicle caused by the accident.

4. The system according to claim 1, wherein the storage further stores contact information of the owner of the power storage stored in the vehicle, and the processor is further configured to specify a communication address of the server based on the contact information when the owner of the power storage is not identical to the owner of the body.

5. The system according to claim 1, wherein the server is further configured to, upon receiving the first accident notification signal, request the replacement station to secure a power storage that replaces the power storage mounted on the body.

6. The system according to claim 1, wherein the server is further configured to:

in response to the server receiving the first accident notification signal, determine, whether the power storage included in the vehicle is covered by an insurance service, and request the replacement station to secure a power storage that replaces the power storage included in the vehicle when it is determined that the power storage included in the vehicle is covered by the insurance service.

7. The system according to claim 1, further comprising the replacement station, wherein the server is further configured to, in response to the server receiving the first accident notification signal, transmit a battery request signal to the replacement station, each of the first accident notification signal and the battery request signal including identification information of the power storage, in response to the replacement station receiving the battery request signal, the identification information included in the battery request signal is registered in the replacement station, and the replacement station is further configured to determine, in response to the replacement station receiving a replacement request signal including identification information of the power storage from the vehicle, whether or not a replacement requirement is satisfied for the vehicle based on whether or not the identification information included in the replacement request signal is registered in the replacement station, to replace the power storage mounted on the vehicle when the replacement requirement is satisfied for the vehicle, and not to replace the power storage mounted on the vehicle when the replacement requirement is not satisfied for the vehicle.

8. The system according to claim 1, wherein the processor is further configured to obtain the degree of damage to the power storage based on a degree of a physical damage to a casing of the power storage.

9. The system according to claim 8, wherein the vehicle further includes:

a battery management system (BMS) that monitors the power storage; and a temperature adjustment system that adjusts a temperature of the power storage, and the processor is further configured to obtain the degree of damage to the power storage further based on a communication level in connection with the BMS, a degree of damage to an electrical component of the power storage, and a degree of damage to the temperature adjustment system.

10. The system according to claim 1, wherein the vehicle further includes a strain sensor that detects a degree of strain of a casing of the power storage, and the processor is further configured to obtain the degree of damage to the power storage based on the degree of strain of the casing detected by the strain sensor.

11. The system according to claim 1, wherein the system further comprises the replacement station.

12. The system according to claim 1, wherein controlling the replacement station to replace the power storage mounted on the vehicle upon receiving the first accident notification signal comprises controlling at least one of a conveyor and a delivery robot to transport a replacement power storage to the vehicle.

\* \* \* \* \*